(12) United States Patent
Seo

(10) Patent No.: US 11,645,197 B2
(45) Date of Patent: May 9, 2023

(54) MEMORY CONTROLLER AND METHOD OF OPERATING THE SAME

(71) Applicant: SK hynix Inc., Icheon-si (KR)

(72) Inventor: Dong Young Seo, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 145 days.

(21) Appl. No.: 17/091,101

(22) Filed: Nov. 6, 2020

(65) Prior Publication Data

US 2021/0357318 A1 Nov. 18, 2021

(30) Foreign Application Priority Data

May 18, 2020 (KR) .......................... 10-2020-0059353

(51) Int. Cl.
*G06F 12/02* (2006.01)
*G06F 12/0837* (2016.01)
*G06F 12/06* (2006.01)

(52) U.S. Cl.
CPC ...... *G06F 12/0246* (2013.01); *G06F 12/0646* (2013.01); *G06F 12/0837* (2013.01); *G06F 2212/7201* (2013.01)

(58) Field of Classification Search
CPC ............ G06F 12/0246; G06F 12/0646; G06F 12/0837; G06F 2212/7201; G06F 7/1048; G06F 7/12; G06F 8/08; G06F 2212/7211
See application file for complete search history.

(56) References Cited

U.S. PATENT DOCUMENTS

| | | | |
|---|---|---|---|
| 10,747,679 B1* | 8/2020 | Larson | G06F 12/1027 |
| 11,138,126 B2* | 10/2021 | Nagarajan | G06F 12/1027 |
| 2014/0223089 A1* | 8/2014 | Kang | G06F 3/0679 |
| | | | 711/103 |
| 2017/0235488 A1* | 8/2017 | Call | G06F 3/0679 |
| | | | 711/103 |
| 2017/0293553 A1* | 10/2017 | Heller | G11C 29/52 |
| 2019/0087327 A1* | 3/2019 | Kanno | G06F 12/0261 |
| 2020/0142744 A1* | 5/2020 | Tolstsikau | G06F 9/5016 |

FOREIGN PATENT DOCUMENTS

| | | |
|---|---|---|
| KR | 10-2016-0150451 A | 12/2016 |
| KR | 10-2020-0095103 A | 8/2020 |
| KR | 1020210115954 | 9/2021 |

* cited by examiner

*Primary Examiner* — Sean D Rossiter
(74) *Attorney, Agent, or Firm* — Perkins Coie LLP

(57) ABSTRACT

Memory controller devices, memory systems, and operating methods for memory controller devices and memory systems are disclosed. In one aspect, a memory controller having improved wear leveling performance is disclosed. The memory controller may control a first memory area and a second memory area, and include a first software layer configured to control the first memory area based on first logical addresses, a second software layer configured to control the second memory area based on second logical addresses, and a logical address manager configured to compare a logical address received from a host with a reference address selected from among a plurality of logical addresses to be used by the host, and transmit the logical address received from the host to the first software layer or the second software layer according to a criterion selected from between a first criterion and a second criterion based on the comparison.

21 Claims, 18 Drawing Sheets

MEMORY CONTROLLER AND METHOD OF OPERATING THE SAME

CROSS-REFERENCE TO RELATED APPLICATION

This patent document claims priority to and benefits of the Korean patent application number 10-2020-0059353, filed on May 18, 2020, which is incorporated herein by reference in its entirety.

TECHNICAL FIELD

The embodiments of the disclosed technology generally relate to an electronic device, and more particularly, to a memory controller and a method of operating the memory controller.

BACKGROUND

Generally, a data storage device is used to temporarily or permanently store data under the control of a host device such as a computer or a smartphone. The data storage device may include a memory device or memory medium configured to store data, and a memory controller configured to control the memory device.

Memory devices may be classified into volatile memory devices and nonvolatile memory devices. A volatile memory device only retains its data while the device is powered and loses its data when power is lost. Examples of a volatile memory device include a static random access memory (SRAM), and a dynamic random access memory (DRAM).

A nonvolatile memory device can retain stored data even in the absence of power supply and thus does not lose its data when power is lost. Examples of a nonvolatile memory device include a read-only memory (ROM), a programmable ROM (PROM), an electrically programmable ROM (EPROM), an electrically erasable programmable ROM (EEPROM), and a flash memory.

SUMMARY

The embodiments of the disclosed technology relate to a memory controller with improved wear-leveling performance, and a method of operating the memory controller.

In an embodiment of the disclosed technology, a memory controller configured to control a first memory area and a second memory area may include a first software layer configured to control the first memory area based on first logical addresses, a second software layer configured to control the second memory area based on second logical addresses, and a logical address manager configured to compare a logical address received from a host with a reference address selected from among a plurality of logical addresses to be used by the host, and transmit the logical address received from the host to the first software layer or the second software layer according to a criterion selected from between a first criterion and a second criterion based on the comparison.

In an embodiment of the disclosed technology, a memory controller configured to control a first memory area and a second memory area may include a first flash translation layer configured to control the first memory area based on a logical address included in a first logical address group, a second flash translation layer configured to control the second memory area based on a logical address included in a second logical address group, and a logical address manager configured to determine logical addresses to be included in the first logical address group and the second logical address group, based on a result of comparison between a reference address and the plurality of logical addresses. The reference address is selected from a host address group including a group of logical addresses to be used by the host.

In an embodiment of the disclosed technology, a method of operating a memory controller that includes a first flash translation layer configured to control a first memory area and a second flash translation layer configured to control a second memory area may include comparing a logical address received from a host with a reference address selected from among a plurality of logical addresses to be used by the host, selecting one of a first criterion and a second criterion based on a comparison between the logical address received from the host and the reference address, and transmitting the logical address to one of the first flash translation layer and the second flash translation layer according to the selected criterion. The logical address is transmitted to different flash translation layers depending on which of the first criterion and the second criterion is selected.

In an embodiment of the disclosed technology, a memory controller configured to control a first memory area and a second memory area may include a first software layer configured to control the first memory area based on first logical addresses, a second software layer configured to control the second memory area based on second logical addresses, and a logical address manager configured to compare a logical address received from a host with a reference address selected from among a plurality of logical addresses received from the host, and transmit the logical address received from the host to a software layer selected from the first software layer or the second software layer based on the comparison.

In an embodiment of the disclosed technology, a memory controller configured to control a first memory area and a second memory area may include a first flash translation layer configured to control the first memory area based on a logical address included in a first logical address group, a second flash translation layer configured to control the second memory area based on a logical address included in a second logical address group, and a logical address manager configured to determine logical addresses to be included in the first logical address group and the second logical address group, based on a result of comparison between a reference address, selected from a host address group including a group of logical addresses received from the host, and the plurality of logical addresses.

In an embodiment of the disclosed technology, a method of operating a memory controller that includes a first flash translation layer configured to control a first memory area and a second flash translation layer configured to control a second memory area may include determining whether to use a first criterion or a second criterion by comparing a logical address received from a host with a reference address selected from among a plurality of logical addresses to be used by the host, wherein the reference address is updated based on change basis information configured to be used as a basis for determining the change to the reference address, determine, based on the determined criterion, whether to select the first software layer or the second software layer for the logical address received from the host, and transmitting the logical address to the first flash translation layer or the second flash translation layer selected according to the criterion selected between the first criterion and the second criterion. The logical address is transmitted to different flash translation layers depending on which of the first criterion and the second criterion is selected.

An embodiment of the disclosed technology may provide for a memory controller configured to control a first memory area and a second memory area. The memory controller may include: a first flash translation layer (FTL) configured to control the first memory area based on first logical addresses; a second FTL configured to control the second memory area based on second logical addresses; and a logical address manager configured to compare a logical address received from a host with a reference address selected from among a plurality of logical addresses capable of being received from the host, and transmit the logical address received from the host to the first FTL or the second FTL based on a criterion selected from between a first criterion and a second criterion depending on a result of the comparison. The logical address received from the host may be transmitted to different FTLs based on the first criterion and the second criterion.

An embodiment of the disclosed technology may provide for a memory controller configured to control a first memory area and a second memory area. The memory controller may include: a first flash translation layer (FTL) configured to control the first memory area based on a logical address included in a first logical address group; a second FTL configured to control the second memory area based on a logical address included in a second logical address group; and a logical address manager configured to determine logical addresses to be included in the first logical address group and the second logical address group, based on a result of comparison between a reference address selected from a host address group that is a group of logical addresses received from the a host and the plurality of logical addresses.

An embodiment of the disclosed technology may provide for a method of operating a memory controller including a first flash translation layer (FTL) configured to control a first memory area, and a second FTL configured to control a second memory area. The method may include: comparing a logical address received from a host with a reference address selected from among a plurality of logical addresses capable of being received from the host and being changed based on change basis information; and transmitting the logical address to the first FTL or the second FTL according to a criterion selected from between a first criterion and a second criterion depending on a result of the comparison of the logical address with the reference address. The logical address may be transmitted to different FTLs based on the first criterion and the second criterion.

DETAILED DESCRIPTION

Specific structural or functional descriptions in the embodiments of the disclosed technology introduced in this specification or application are only for description of the embodiments of the disclosed technology. The descriptions should not be construed as being limited to the embodiments described in the specification or application.

Figure 1:
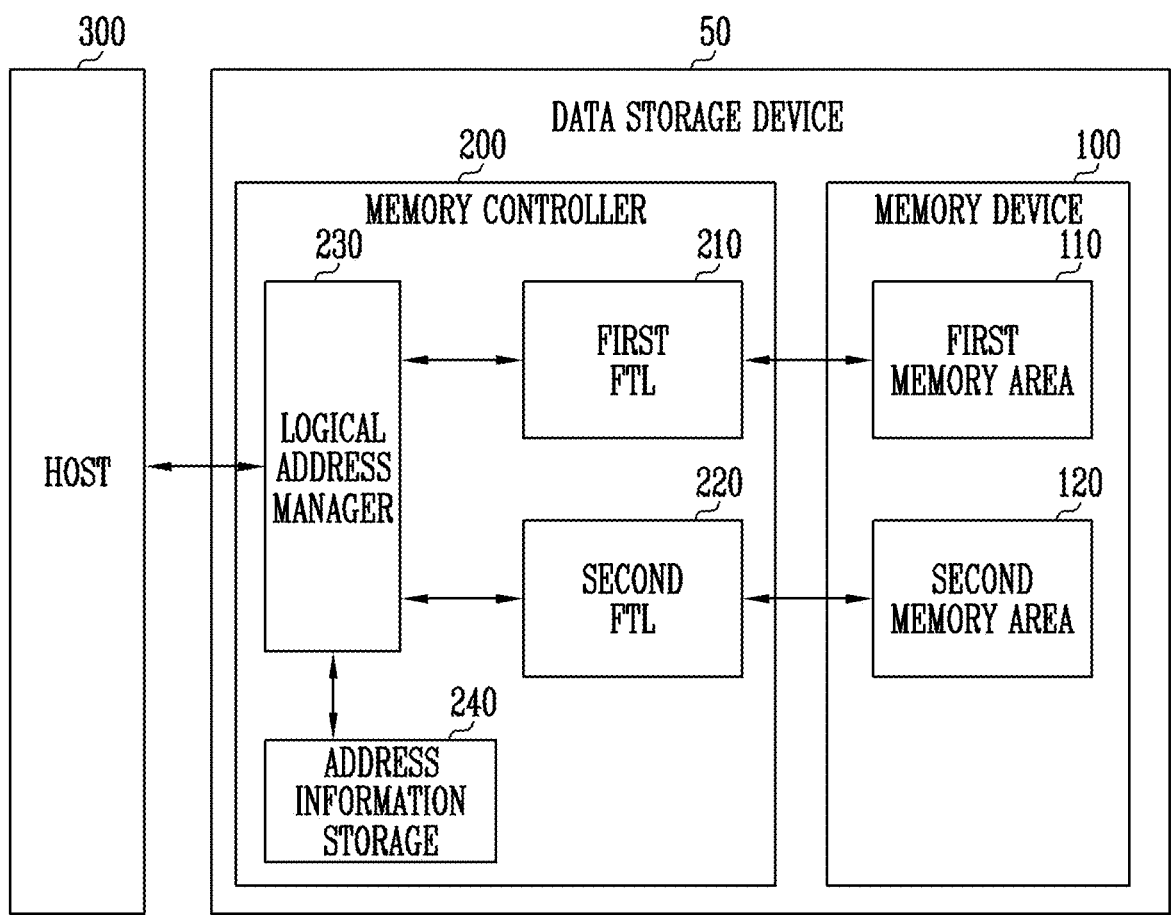
FIG. 1 is a block diagram illustrating an example of a data storage device.

FIG. 1 is a block diagram illustrating an example of a data storage device.

Referring to FIG. 1, the data storage device 50 may include a memory device 100 and a memory controller 200 configured to control the operation of the memory device 100.

The data storage device 50 may be a device configured to store data under control of a host 300 such as a cellular phone, a smartphone, an MP3 player, a laptop computer, a desktop computer, a game machine, a TV, a tablet PC, or an in-vehicle infotainment system.

The data storage device 50 may be implemented in any one of various kinds of data storage devices that is compatible to a host interface in communication with the host 300. Examples of the data storage device 50 may include an SSD, MMC, eMMC, RS-MMC, or micro-MMC type multimedia card, an SD, mini-SD, micro-SD type secure digital card, a universal serial bus (USB) data storage device, a universal flash storage (UFS) device, a personal computer memory card international association (PCMCIA) card type data storage device, a peripheral component interconnection (PCI) card type data storage device, a PCI-express (PCI-E) card type data storage device, a compact flash (CF) card, a smart media card, and a memory stick.

The package types for the data storage device 50 include a package on package (POP) type, a system in package (SIP)

type, a system on chip (SOC) type, a multi-chip package (MCP) type, a chip on board (COB) type, a wafer-level fabricated package (WFP) type, and a wafer-level stack package (WSP) type.

The memory device 100 may store data therein. The memory device 100 may operate under control of the memory controller 200.

In some implementations, the data storage device 50 may include a flash translation layer (FTL) that manages the operations of the memory device 100. For example, the FTL performs logical to physical address mapping, garbage collection, wear-leveling, error detection/correction, and bad block management. In some implementations, the data storage device 50 may include a plurality of FTLs and a plurality of hardware and/or software components that interacts with each other to construct the FTL. The FTL may be referred to as a software layer.

In an example data storage device that includes a plurality of FTLs, each FTL can be assigned one or more memory locations to manage memory operations of the one or more memory locations. The FTLs operate independently of each other to manage operations of different memory locations in parallel.

In an embodiment, the memory device 100 may include a first memory area 110 and a second memory area 120. The first memory area 110 may operate under control of a first flash translation layer (FTL) 210. The second memory area 120 may operate under control of a second FTL 220. For the sake of simplicity of description, only two memory areas are illustrated in FIG. 1, but the scope of the disclosed technology is not limited thereto, and thus the memory device 100 may include three or more memory areas. The plurality of memory areas may operate independently of each other under control of different FTLs such that each FTL can manage operations of one or more memory areas. For example, the memory device 100 may include first to fourth memory areas. The first to fourth memory areas may operate under control of the first to fourth FTLs, respectively. For the sake of simplicity of explanation, only the first FTL 210 and the second FTL 220 of the first to fourth FTLs, and only the first memory area 110 and the second memory area 120 of the first to fourth memory areas will be discussed. As noted above, the number of FTLs included in the memory controller 200 and the number of memory areas included in the memory device 100 are not limited to the present example.

The first memory area 110 and the second memory area 120 each may include a memory cell array. The memory cell array may include a plurality of memory cells configured to store data. The first memory area 110 and the second memory area 120 each may include a peripheral circuit and a control logic. The first memory area 110 and the second memory area 120 may be controlled by different processors. In detail, the first memory area 110 may be controlled by the first FTL 210. The second memory area 120 may be controlled by the second FTL 220.

The memory cells may include a single level cell (SLC) capable of storing a single data bit per cell, a multi-level cell (MLC) capable of storing two data bits per cell, a triple-level cell (TLC) capable of storing three data bits per cell, or a quad-level cell (QLC) capable of storing four data bits per cell.

The memory cell array may include a plurality of memory blocks. Each memory block may include a plurality of memory cells. Each memory block may include a plurality of pages, each of which includes a plurality of memory cells. In an embodiment, the page may be the smallest unit that can be programmed (or written to) or read. The memory block may be the smallest unit that can be erased.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), or a spin transfer torque random access memory (SU-RAM). In this specification, for the sake of simplicity of explanation, it is assumed that the memory device 100 is a NAND flash memory.

The memory controller 200 can access the memory device 100 by providing commands and addresses. The memory controller 200 may access an area of the memory cell array in the memory device 100 that is selected by the address to perform an operation corresponding to the command on the selected area of the memory cell array in the memory device 100. For example, the memory device 100 may perform a write (program) operation, a read operation, and an erase operation. During a program operation, the memory device 100 may write data to an area selected by an address. During a read operation, the memory device 100 may read data from an area selected by an address. During an erase operation, the memory device 100 may erase data from an area selected by an address.

In an embodiment, the first memory area 110 may receive a command and an address from the first FTL 210. The second memory area 120 may receive a command and an address from the second FTL 220. The memory device 100 may include a plurality of memory areas. The plurality of memory areas may receive commands and addresses from different FTLs, respectively. For example, the memory device 100 may include first to fourth memory areas. The first to fourth memory areas may receive commands and addresses from the first to fourth FTLs, respectively.

During a power up procedure of the data storage device 50, the memory controller 200 may execute firmware (FW) operations to manage the memory device 100. The firmware FW may include a host interface layer (HIL) configured to receive a request input from the host 300 or output a response to the host 300, a flash translation layer (FTL) configured to manage an operation between an interface of the host 300 and an interface of the memory device 100, and a flash interface layer (FIL) configured to provide a command to the memory device 100 or receive a response from the memory device 100.

In an embodiment, the HIL may include a logical address (LA) manager 230. The LA manager 230 may receive a logical address (LA) from the host 300 and transmit the LA to the first FTL 210 and the second FTL 220. In an embodiment, the LA manager 230 may transmit the LA received from the host 300 to the first FTL 210 and the second FTL 220 through a modular operation. For example, The LA manager 230 may transmit, to the first FTL 210, an LA having 0 as the remainder when the LA is divided by 2 among the LAs received from the host 300. In other words, the logical address manager 230 may transmit an even logical address (even LA) to the first FTL 210. The LA manager 230 may transmit an odd logical address (odd LA) to the second FTL 220. A plurality of LAs that the LA manager 230 can receive from the host 300 may be a host address group. A plurality of LAs that the first FTL 210 receives from the LA manager 230 may be a first LA group. A plurality of LAs that the second FTL 220 receives from the LA manager 230 may be a second LA group.

In an embodiment, the LA manager 230 may transmit the LA received from the host 300 to a plurality of FTLs through a modular operation. For example, the first to fourth FTLs may receive different LAs depending on the remainders when the LAs are divided by 4 among the LAs received from the host 300. In other words, the first FTL may receive an LA having 0 as the remainder when the LA is divided by 4 among the LAs received from the host 300. The second FTL may receive an LA having 1 as the remainder when the LA is divided by 4 among the LAs received from the host 300. The third FTL may receive an LA having 2 as the remainder when the LA is divided by 4 among the LAs received from the host 300. The fourth FTL may receive an LA having 3 as the remainder when the LA is divided by 4 among the LAs received from the host 300. Each of the plurality of FTLs may translate the received LA into a physical address and transmit the physical address to a corresponding memory area that is controlled by the FTL.

In an embodiment, the memory controller 200 may include an address information storage 240. The address information storage 240 may include address information about a host address group, a first LA group, and a second LA group. The LA manager 230 may transmit an LA received from the host 300 to the first FTL 210 or the second FTL 220, based on the address information stored in the address information storage 240.

The memory controller 200 may receive data and an LA from the host 300, and translate the LA into a physical address (PA) indicating an Lo address of a memory cell to which data is to be stored, the memory cell being included in the memory device 100. The LA may be a logical block address (LBA). The physical address may be a physical block address (PBA).

In an embodiment, the first FTL 210 may receive a first LA included in the first LA group from the LA manager 230, and translate the first LA into a PA indicating a storage area included in the first memory area 110. The second FTL 220 may receive a second LA included in the second LA group from the LA manager 230, and translate the second LA into a PA indicating a storage area included in the second memory area 120. In an embodiment, each of the plurality of FTLs may translate an LA received from the LA manager 230 into a PA indicating a storage area included in a corresponding memory area. For example, each of the first to fourth FTLs may translate an LA received from the LA manager 230 into a PA indicating a storage area included in a corresponding one of the first to fourth memory areas.

The memory controller 200 may control the memory device 100 to perform a program operation, a read operation, or an erase operation in response to a request from the host 300. During the program operation, the memory controller 200 may provide a program command, a PBA, and data to the memory device 100. During the read operation, the memory controller 200 may provide a read command and a PBA to the memory device 100. During the erase operation, the memory controller 200 may provide an erase command and a PBA to the memory device 100.

In an embodiment, the first FTL 210 may control the first memory area 110 to perform a program operation, a read operation, or an erase operation in response to a request from the host 300. In an embodiment, the memory controller 200 may receive, from the host 300, an LA along with the request from the host 300. The LA manager 230 included in the memory controller 200 may transmit the LA received from the host 300 to the first FTL 210. The first FTL 210 may control the first memory area 110 to perform an operation corresponding to the LA received from the LA manager 230. The operation corresponding to the LA may be determined in response to a request received from the host 300. The second FTL 220 may control the second memory area 120 to perform a program operation, a read operation, or an erase operation in response to a request from the host 300. In an embodiment, the memory controller 200 may receive, from the host 300, an LA along with the request from the host 300. The LA manager 230 included in the memory controller 200 may transmit the LA received from the host 300 to the second FTL 220. The second FTL 220 may control the second memory area 120 to perform an operation corresponding to the LA received from the LA manager 230. The operation corresponding to the LA may be determined in response to a request received from the host 300.

In an embodiment, each of the plurality of FTLs may control a corresponding memory area based on an LA received from the LA manager 230 to perform a program operation, a read operation, or an erase operation in response to a request from the host 300. For example, each of the first to fourth FTLs may control a corresponding one of the first to fourth memory areas to perform a program operation, a read operation, or an erase operation in response to a request from the host 300.

The memory controller 200 may autonomously control the memory device 100 to perform a program operation, a read operation, or an erase operation regardless of a request from the host 300. For example, the memory controller 200 may control the memory device 100 to perform a program operation, a read operation, or an erase operation which is used to perform background operations such as a wear leveling operation, a garbage collection operation, and a read reclaim operation.

The host 300 may communicate with the data storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
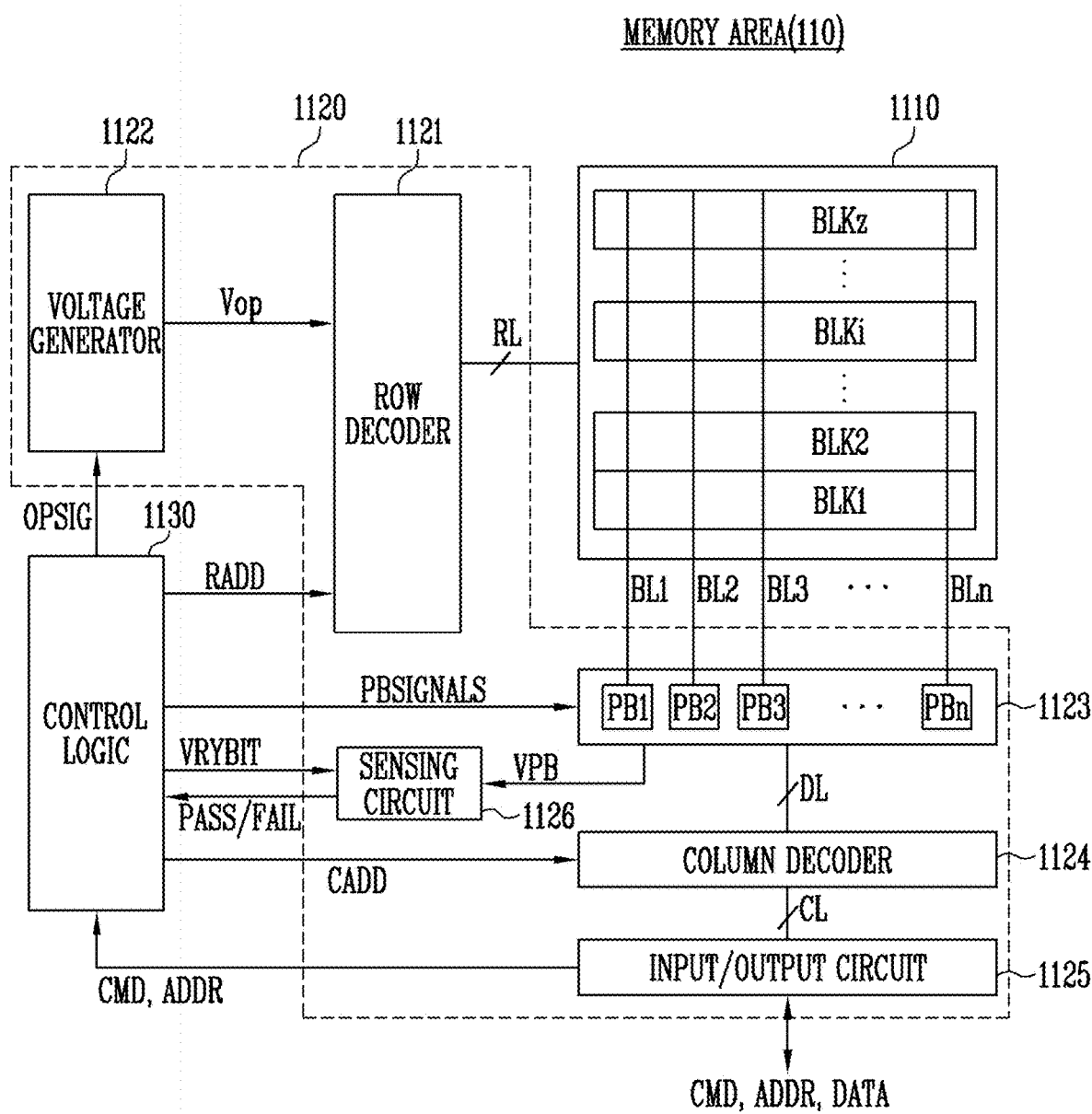
FIG. 2 illustrates an example of a memory area.

FIG. 2 illustrates an example of a memory area.

Referring to FIG. 2, a first memory area 110 may include a memory cell array 1110, a peripheral circuit 1120, and a control logic 1130. The second memory area 120 may have the same structure as that of the first memory area 110. In an embodiment, the memory device 100 may include a plurality of memory areas. Each of the plurality of memory areas may have the same structure as that of the first memory area 110.

The memory cell array 1110 may include a plurality of memory blocks BLK1 to BLKz. The plurality of memory blocks BLK1 to BLKz are coupled to a row decoder 1121 through row lines RL. The plurality of memory blocks BLK1 to BLKz may be coupled to a page buffer group 1123 through bit lines BL1 to BLn. Each of the memory blocks BLK1 to BLKz may include a plurality of memory cells. In an embodiment, the plurality of memory cells may be nonvolatile memory cells. Memory cells coupled to the same word line may be defined as one page. Hence, each memory block may include a plurality of pages.

The row lines RL may include at least one source select line, a plurality of word lines, and at least one drain select line.

Each of the memory cells included in the memory cell array 1110 may be formed of a single-level cell (SLC) capable of storing a single data bit per cell, a multi-level cell (MLC) capable of storing two data bits per cell, a triple-level cell (TLC) capable of storing three data bits per cell, or a quad-level cell (QLC) capable of storing four data bits per cell.

The peripheral circuit 1120 may perform a program operation, a read operation, or an erase operation on a selected area of the memory cell array 1110 under control of the control logic 1130. The peripheral circuit 1120 may perform operations associated with the memory cell array 1110. For example, the peripheral circuit 1120 may apply various operating voltages to the row liens RL and the bit lines BL1 to BLn or discharge the applied voltages, under control of the control logic 1130.

The peripheral circuit 1120 may include the row decoder 1121, a voltage generator 1122, the page buffer group 1123, a column decoder 1124, an input/output circuit 1125, and a sensing circuit 1126.

The row decoder 1121 is coupled to the memory cell array 1110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 1121 may operate under control of the control logic 1130. The row decoder 1121 may receive a row address RADD from the control logic 1130.

The row decoder 1121 may decode the row address RADD. The row decoder 1121 may select at least one memory block of the memory blocks BLK1 to BLKz in response to the decoded address. The row decoder 1121 may select at least one word line WL of the selected memory block in response to the decoded address so that voltages generated from the voltage generator 1122 are applied to the at least one word line WL.

For example, during a program operation, the row decoder 1121 may apply a program voltage to a selected word line and apply a program pass voltage having a level lower than that of the program voltage to unselected word lines. During a program verify operation, the row decoder 1121 may apply a verify voltage to a selected word line and apply a verify pass voltage higher than the verify voltage to unselected word lines. During a read operation, the row decoder 1121 may apply a read voltage to a selected word line and apply a read pass voltage higher than the read voltage to unselected word lines.

In an embodiment, the erase operation of the memory cell array 1110 may be performed on a memory block basis. During an erase operation, the row decoder 1121 may select one memory block in response to a decoded address. During the erase operation, the row decoder 1121 may apply a ground voltage to word lines coupled to the selected memory block.

The voltage generator 1122 may operate under control of the control logic 1130. The voltage generator 1122 may generate a plurality of voltages using an external supply voltage supplied to the memory device 100. In detail, the voltage generator 1122 may generate various operating voltages Vop to be used for a program operation, a read operation, and an erase operation in response to an operating signal OPSIG. For example, the voltage generator 1122 may generate a program voltage, a verify voltage, a pass voltage, a read voltage, an erase voltage, and so forth under control of the control logic 1130.

In an embodiment, the voltage generator 1122 may generate an internal supply voltage by regulating the external supply voltage. The internal supply voltage generated by the voltage generator 1122 is used as an operating voltage for the memory cell array 1110.

In an embodiment, the voltage generator 1122 may generate a plurality of voltages using an external power supply voltage or an internal power supply voltage.

For example, the voltage generator 1122 may include a plurality of pumping capacitors for receiving the internal supply voltage and generate a plurality of voltages by selectively activating the plurality of pumping capacitors under control of the control logic 1130.

The generated voltages may be supplied to the memory cell array 1110 by the row decoder 1121.

The page buffer group 1123 may include first to n-th page buffers PB1 to PBn. The first to n-th page buffers PB1 to PBn are coupled to the memory cell array 1110 through the first to n-th bit lines BL1 to BLn, respectively. The first to n-th page buffers PB1 to PBn may operate under control of the control logic 1130. In detail, the first to n-th page buffers PB1 to PBn may operate in response to page buffer control signals PBSIGNALS. For instance, the first to n-th page buffers PB1 to PBn may temporarily store data received through the first to n-th bit lines BL1 to BLn, or sense voltages or currents of the first to n-th bit lines BL1 to BLn during a read operation or a verify operation.

In detail, during a program operation, the first to n-th page buffers PB1 to PBn may transmit data DATA received through the input/output circuit 1125 to selected memory cells through the first to n-th bit lines BL1 to BLn when a program pulse is applied to a selected word line. The memory cells in the selected page are programmed based on the transmitted data DATA. A memory cell coupled to a bit line to which a program enable voltage (e.g. a ground voltage) is applied may have an increased threshold voltage. The threshold voltage of a memory cell coupled to a bit line to which a program inhibit voltage (for example, a supply voltage) is applied may be retained. During a program verify operation, the first to n-th page buffers PB1 to PBn may read page data from selected memory cells through the first to n-th bit lines BL1 to BLn.

During a read operation, the first to n-th page buffers PB1 to PBn may read data DATA from memory cells of a selected page through the first to n-th bit lines BL1 to BLn, and output the read data DATA to the input/output circuit 1125 under control of the column decoder 1124.

During an erase operation, the first to n-th page buffers PB1 to PBn may float the first to n-th bit lines BL1 to BLn.

The column decoder 1124 may transmit data between the input/output circuit 1125 and the page buffer group 1123 in response to a column address CADD. For example, the column decoder 1124 may exchange data with the first to n-th page buffers PB1 to PBn through data lines DL or exchange data with the input/output circuit 1125 through column lines CL.

The input/output circuit 1125 may transmit, to the control logic 1130, a command CMD or an address ADDR received from the memory controller 200 described with reference to FIG. 1, or may exchange data DATA with the column decoder 1124.

During a read operation or a verify operation, the sensing circuit 1126 may generate a reference current in response to an enable bit signal VRYBIT, and may compare a sensing voltage VPB received from the page buffer group 1123 with a reference voltage generated by the reference current and output a pass signal PASS or a fail signal FAIL.

The control logic 1130 may output an operating signal OPSIG, a row address RADD, page buffer control signals PBSIGNALS, and an enable bit signal VRYBIT in response to a command CMD and an address ADD, and thus control the peripheral circuit 1120. In addition, the control logic 1130 may determine whether a target memory cell has passed a verification during a verify operation in response to a pass signal PASS or a fail signal FAIL.

Figure 3:
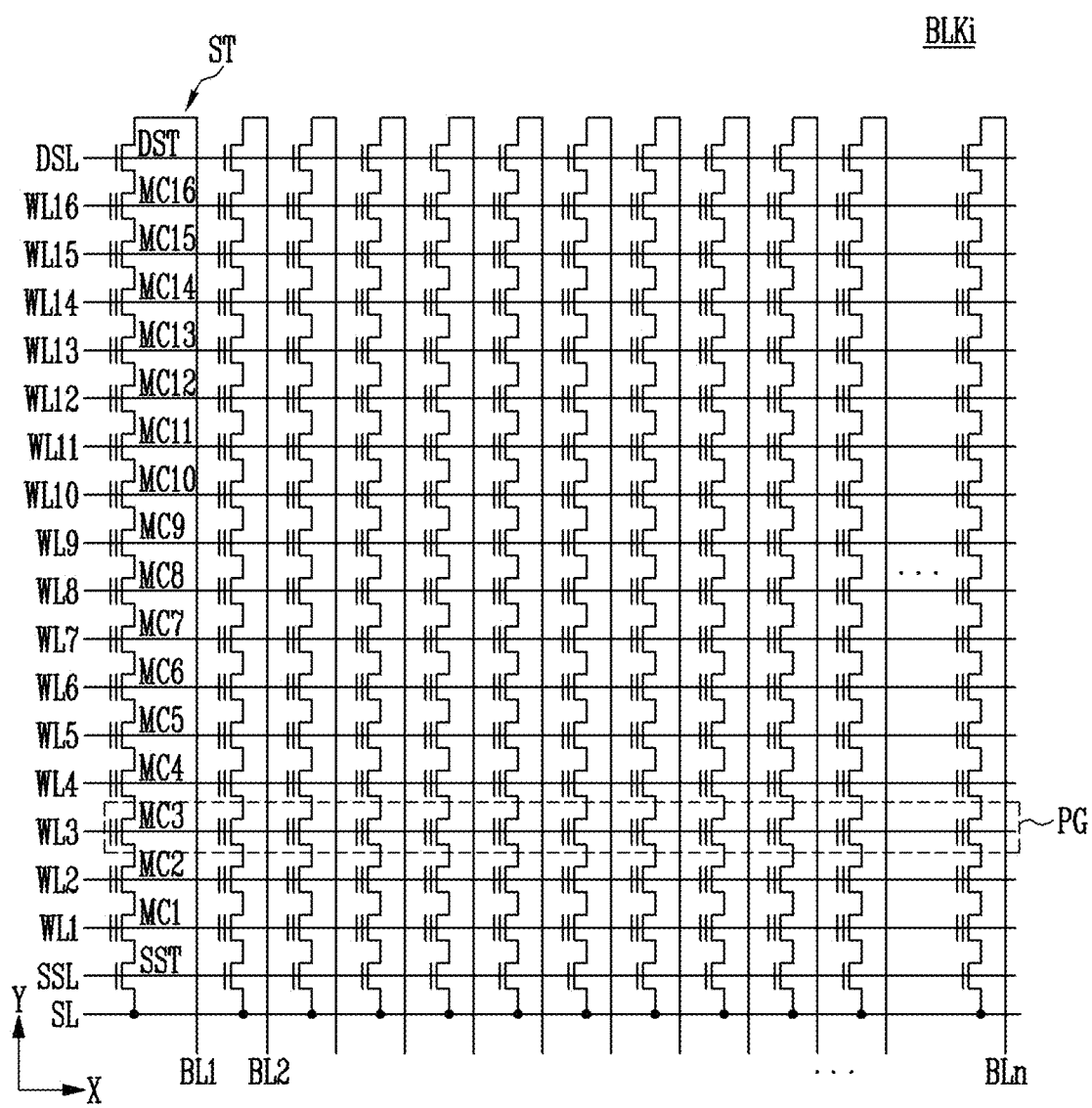
FIG. 3 illustrates an example of a memory block BLKi of FIG. 2.

FIG. 3 illustrates an example of a memory block BLKi of FIG. 2.

Referring to FIG. 3, in the memory block BLKi, a plurality of word lines extending in a common direction may be arranged between a first select line and a second select line. Each of the plurality of word lines is coupled to a plurality of memory cells. Here, the first select line may be a source select line SSL, and the second select line may be a drain select line DSL. In some implementations, the memory block BLKi may include a plurality of strings ST coupled between the bit lines BL1 to BLn and the source line SL. Each of the plurality of strings ST includes a plurality of memory cells coupled in series to each other. The bit lines BL1 to BLn may be respectively coupled to the strings ST, and the source lines SL may be coupled in common to the strings ST. The strings ST may have the same configuration; therefore, the string ST that is coupled to the first bit line BL1 will be described in detail by way of example.

The string ST may include a source select transistor SST, a plurality of memory cells MC1 to MC16, and a drain select transistor DST which are coupled in series to each other between the source line SL and the first bit line BL1. At least one source select transistor SST and at least one drain select transistor DST may be included in each string ST, and a larger number of memory cells than the number of memory cells MC1 to MC16 shown in the drawing may be included in each string ST.

A source of the source select transistor SST may be coupled to the source line SL, and a drain of the drain select transistor DST may be coupled to the first bit line BL1. The memory cells MC1 to MC16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells MC1 to MC16 may be coupled to the plurality of word lines WL1 to WL16. Among the memory cells included in different strings ST, a group of memory cells coupled to each word line may be referred to as a physical page PG. Therefore, the number of physical pages PG included in the memory block BLKi may correspond to the number of word lines WL1 to WL16.

Each memory cell may store 1-bit data. This memory cell is typically called a single level cell (SLC). In this case, each physical page PG is mapped to one logical page (LPG) of data. One logical page (LPG) of data may include data bits corresponding to the number of cells included in a single physical page PG.

Furthermore, each memory cell may store 2- or more-bit data. In this case, each physical page PG may store two or more LPGs of data.

Figure 4:
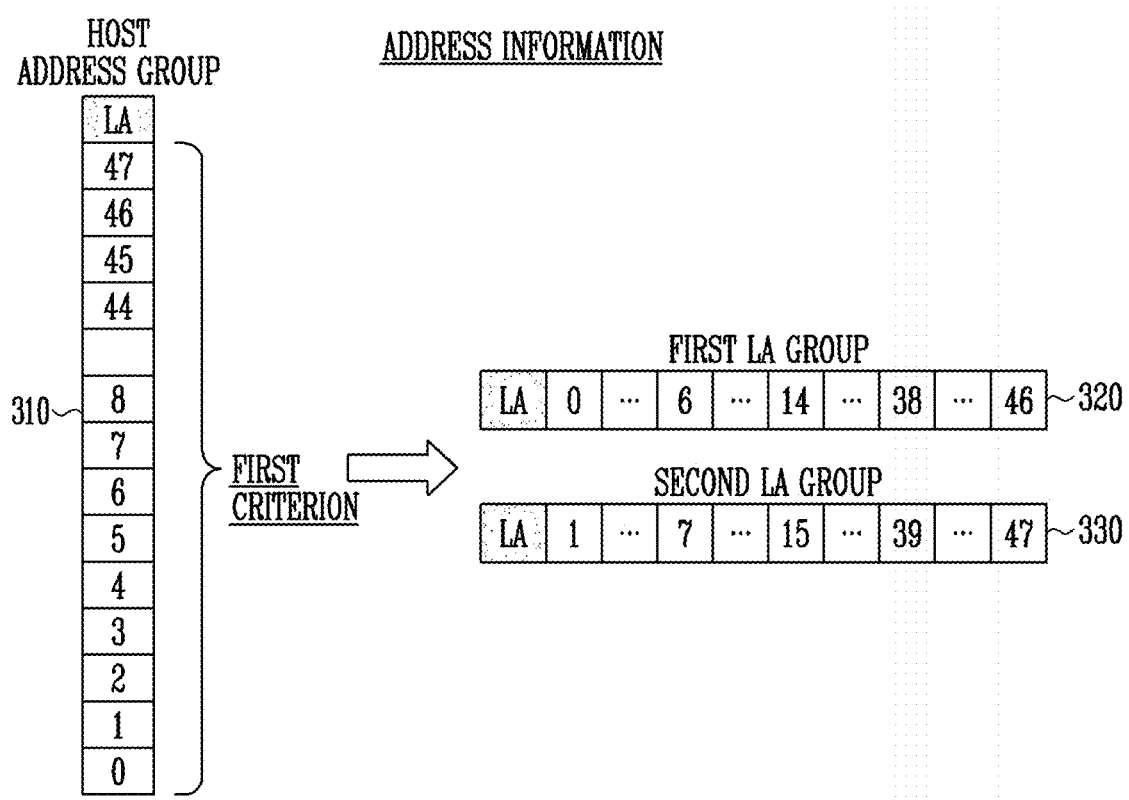
FIG. 4 illustrates an example of address information stored in an address information storage.

FIG. 4 illustrates an example of address information stored in an address information storage.

Referring to FIG. 4, the address information may include host address group information 310, first LA group information 320, and second LA group information 330. The host address group information 310 may indicate a group of LAs that are available to be used by the host. In other words, the host address group information 310 may include a group of logical addresses that the host may possibly transmit to the FTLs to access the corresponding memory locations. The first LA group information 320 may indicate a group of LAs that can possibly be transmitted to the first FTL 210, among LAs included in the host address group information 310. The second LA group information 330 may indicate a group of LAs that can possibly be transmitted to the second FTL 220 among LAs included in the host address group information 310.

The first LA group information 320 and the second LA group information 330 may be generated based on a first criterion. In some implementations, the first LA group information 320 and the second LA group information 330 may be used to determine whether a certain logical address belongs to a first LA group or a second LA group based on a first criterion. A plurality of LAs included in the host address group may be determined to belong to the first LA group, or the second LA group, or both the first and second LA groups, based on the first criterion. For example, according to the first criterion, LAs having 0 as the remainder when the LAs are divided by 2, among the plurality of LAs included in the host address group, may be included in the first LA group. In other words, the LAs included in the first LA group information 320 may be even Las (even-numbered logical addresses). According to the first criterion, LAs having 1 as the remainder when the LAs are divided by 2, among the plurality of LAs included in the host address group, may be included in the second LA group. In other words, the LAs included in the second LA group information 330 may be odd Las (odd-numbered logical addresses). As a result, according to the first criterion, even LAs may be transmitted to the first FTL 210, and odd LAs may be transmitted to the second FTL 220.

The LA manager 230 may receive an LA from the host 300 and transmit the LA to the first FTL 210 and the second FTL 220 with reference to the address information. For example, in the case where the LA manager 230 receives an even LA from the host 300, the LA manager 230 may transmit the even LA to the first FTL 210 with reference to the address information. In the case where the LA manager 230 receives an odd LA from the host 300, the LA manager 230 may transmit the odd LA to the second FTL 220 with reference to the address information.

Figure 5:
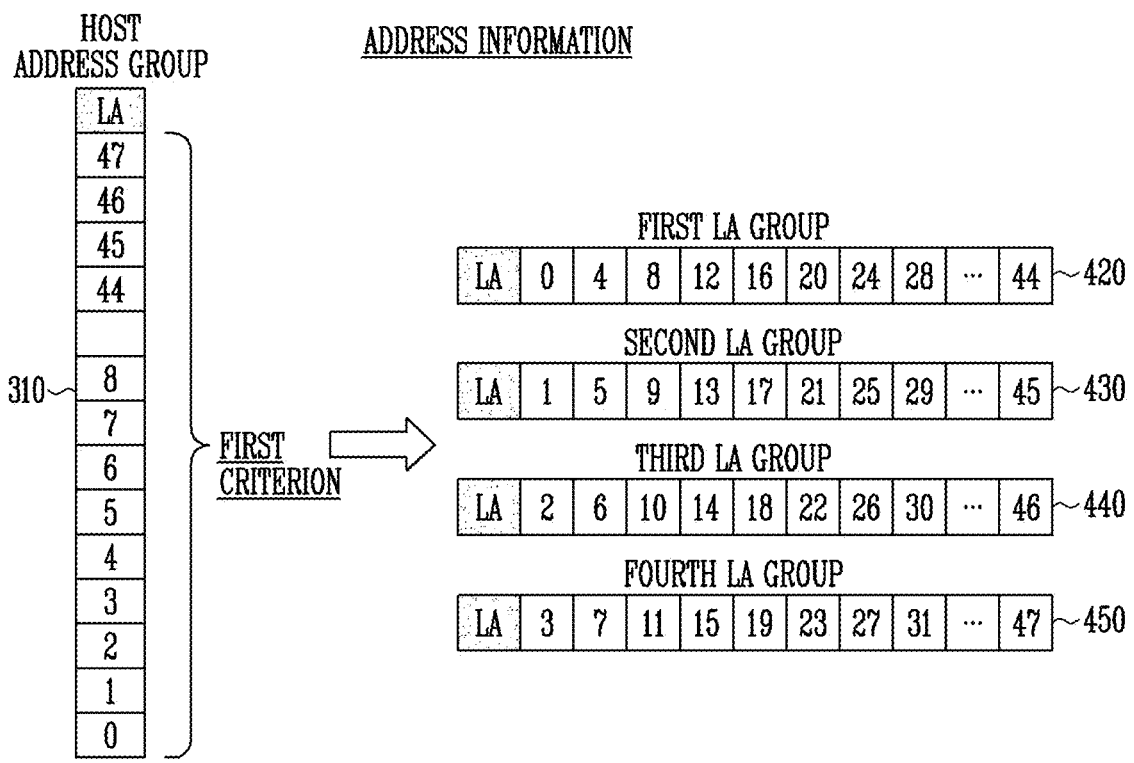
FIG. 5 illustrates another example of the address information.

FIG. 5 illustrates another example of the address information.

Referring to FIG. 5, the address information may include host address group information 310, first LA group information 420, second LA group information 430, third LA group information 440, and fourth LA group Lo information 450.

The host address group information 310 may indicate a group of LAs that are available to be used by the host. In other words, the host address group information 310 may include a group of logical addresses that the host may possibly transmit to the FTLs to access the corresponding memory locations. The first to fourth LA group information 420 to 450 may include information about LAs to be transmitted to the first to fourth FTLs, respectively. In one example, the first to fourth LA group information 420 to 450 may include logical addresses (Las) to be transmitted to the first to fourth FTLs. The first to fourth FTLs may respectively control first to fourth memory areas.

The first to fourth LA group information 420 to 450 may be generated based on the first criterion. In some implementations, the first to fourth LA group information 420 to 450 may be used to determine whether a certain logical address belongs to a first LA group, a second LA group, a third LA group or a fourth LA group based on the first criterion. A plurality of LAs included in the host address group may be divided into the first to fourth LA groups based on the first criterion. According to the first criterion, LAs having 0 as the remainder when the LAs are divided by 4, among the plurality of LAs included in the host address group, may be included in the first LA group. According to the first criterion, LAs having 1 as the remainder when the LAs are divided by 4, among the LAs included in the host address group, may be included in the second LA group. According to the first criterion, LAs having 2 as the remainder when the LAs are divided by 4, among the LAs included in the host address group, may be included in the third LA group. According to the first criterion, LAs having 3 as the remainder when the LAs are divided by 4, among the LAs included in the host address group, may be included in the fourth LA group.

The LA manager 230 may receive an LA from the host 300 and transmit the LA to the first to fourth FTLs by determining which of the first to fourth FTLs will take the LA based on the address information. For example, in the case where the LA manager 230 receives LA 0 from the host 300, the LA manager 230 may transmit LA 0 to the first FTL based on the address information. In the case where the LA manager 230 receives LA 1 from the host 300, the LA manager 230 may transmit LA 1 to the second FTL based on the address information. In the case where the LA manager 230 receives LA 2 from the host 300, the LA manager 230 may transmit LA 2 to the third FTL based on the address information. In the case where the LA manager 230 receives LA 3 from the host 300, the LA manager 230 may transmit LA 3 to the fourth FTL based on the address information.

Although FIG. 5 illustrates the LA manager 230 that generates four logical address groups, the number of LA groups is not limited thereto. Hereinafter, for the sake of simplicity of explanation, the LA address manager 230 configured to generate two LA groups will be discussed below with reference to FIG. 6 as an example.

Figure 6:
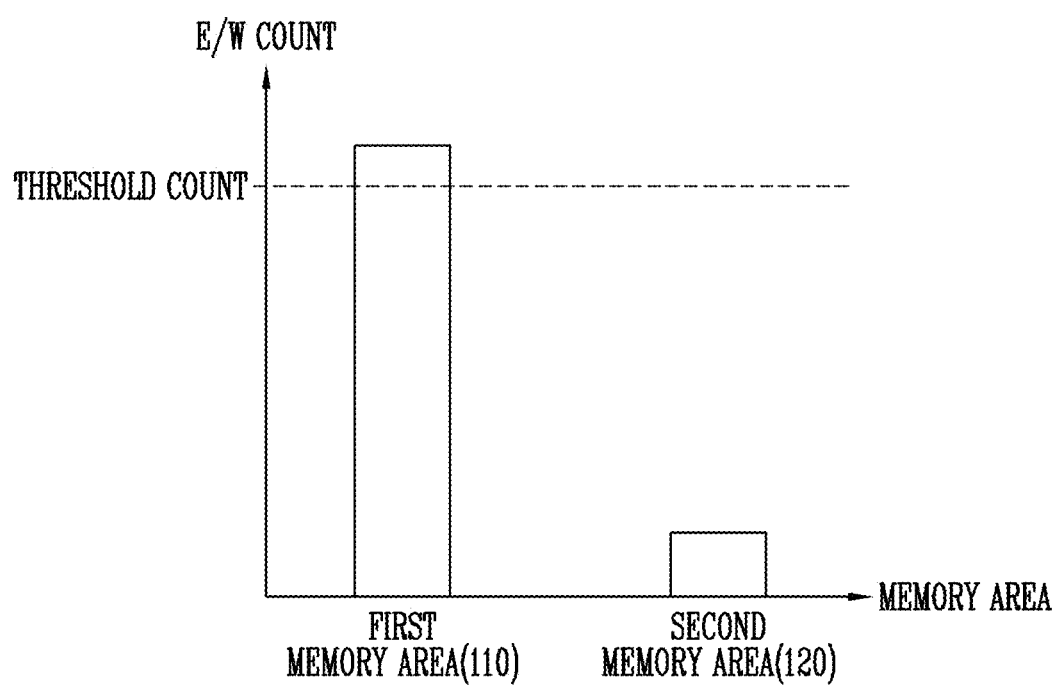
FIG. 6 illustrates variations in wear levels that may occur in a data storage device.

FIG. 6 illustrates variations in wear levels that may occur in a data storage device.

Referring to FIG. 6, let an erase/write cycle (E/W) count of the first memory area 110 exceed a threshold count, and an E/W count of the second memory area 120 be less than the threshold count. As the number of even LAs received to the first FTL 210 increases, the E/W count of the first memory area 110 may increase. As the number of odd LAs received to the second FTL 220 increases, the E/W count of the second memory area 120 may increase. Therefore, when as illustrated in FIG. 4 an LA received from the host 300 is transmitted to the first FTL 210 or the second FTL 220 based on the preset first criterion, there can be variations in wear levels (the E/W count of the first memory area 110 has reached the threshold count while the E/W count of the second memory area 120 is far below the threshold count).

In the case where the E/W count of the first memory area 110 exceeds the threshold count, it can be determined that the memory device 100 has reached its end of life. When the E/W count of the first memory area 110 exceeds the threshold count, not only the first memory area 110 but also the second memory area 120 cannot be used. Once a memory device has reached its end of life, data cannot be written to the memory device 100, and data cannot be read from the memory device 100.

Physical addresses of the memory device mapped to logical addresses can be unevenly accessed if odd numbered LAs are more frequently accessed than even numbered LAs, or vice versa. For example, if even LAs are more frequently received from the host 300, the number of LAs to be transmitted to the first memory area 110 based on the first criterion may be increased. Furthermore, the E/W count of the first memory area 110 may greatly increase compared to the E/W count of the second memory area 120. Therefore, there can occur variations in wear levels between odd numbered logical addresses and even numbered logical addresses if the first criterion is the only basis for the distribution among logical addresses.

Figure 7:
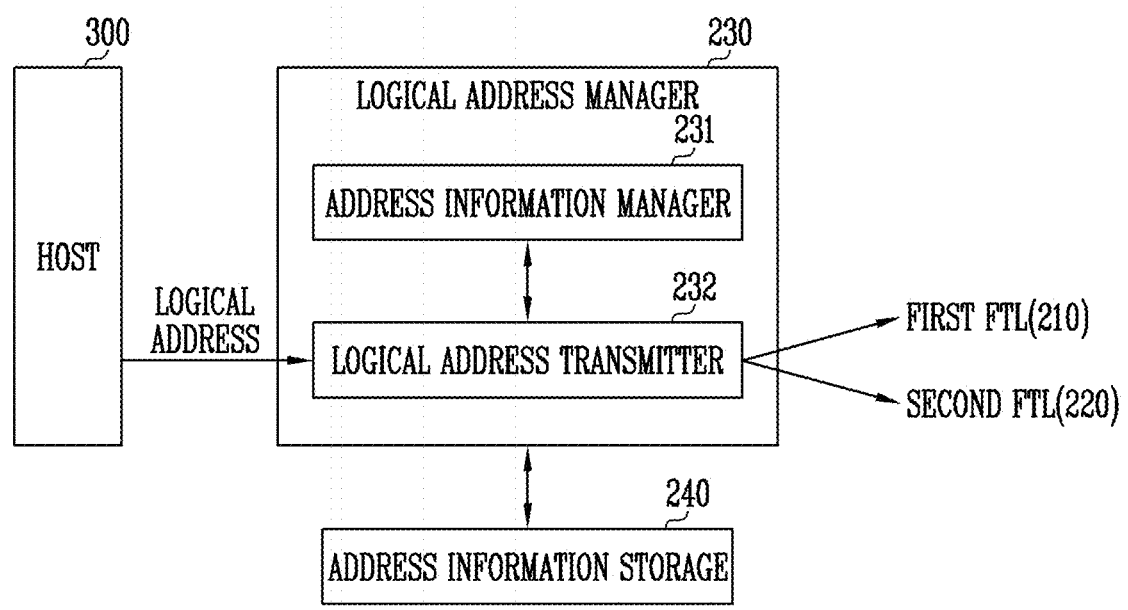
FIG. 7 illustrates an example of a logical address manager based on an embodiment of the disclosed technology.

FIG. 7 illustrates an example of the LA manager 230 based on an embodiment of the disclosed technology.

Referring to FIG. 7, the LA manager 230 may include an address information manager 231 and an LA transmitter 232.

The address information manager 231 may manage address information stored in the address information storage 240.

The address information manager 231 may generate first LA group information 320 and second LA group information 330 based on the first criterion. In some implementations, the address information manager 231 may include, in the first LA group information 320 or the second LA group information 330 based on the first criterion, a plurality of LAs included in the host address group information 310. In some implementations, according to the first criterion, LAs having 0 as the remainder when the LAs are divided by 2 among the plurality of LAs included in the host address group may be included in the first LA group. According to the first criterion, LAs having 1 as the remainder when the LAs are divided by 2 among the plurality of LAs included in the host address group may be included in the second LA group. In other words, the Lo address information manager 231 may include even LAs in the first LA group information 320 and include odd LAs in the second LA group information 330. For example, LA0, LA2, etc., which are even LAs, among LA 0 to LA 47 included in the host address group information 310, may be included in the first LA group information 320. LA1, LA3, etc., which are odd LAs, among LA 0 to LA 47 included in the host address group information 310, may be included in the second LA group information 330.

The address information manager 231 may update or make a change to the first LA group information 310 and the second LA group information 320 upon determination that LAs are in a swap area according to a second criterion in addition to or instead of the first criterion. Here, the determination can be made based on a reference address. In determining whether an LA is supposed to follow the first criterion or the second criterion, it can be determined first whether the LA is in a first LA group determined by the first criterion or a second LA group determined by the second criterion, which is different from the first LA group. For example, an LA having 0 as the remainder when the LA is divided by 2 may be determined to be included in the first LA group information 310 based on the first criterion and may be determined to be included in the second LA group information 320 based on the second criterion.

The reference address may be changed or updated based on a swap timing and a swap offset. In some implementations, the reference address may be changed by the swap offset at the swap timing. The swap timing and the swap offset may be set based on change basis information. The change basis information may be information that is basis for the reference address changes/updates and related to an internal operation to be performed in the memory device 100. For example, the change basis information may include information about the size of data received from the host 300. In other words, the swap timing may be set such that the reference address is changed each time a preset size of data is received from the host 300. As the size of data received from the host 300 increases, the swap offset may increase. The change basis information may include information about the number of requests received from the host 300. For example, the swap timing may be set such that the reference address is changed each time a preset number of requests is received from the host 300. As the number of requests received from the host 300 increases, the swap offset may increase. The change basis information may include timer information which is initialized when the reference address is updated. For example, the swap timing may be set such that the reference address is changed at each preset time.

A method of determining a swap area by the reference address will be described with reference to FIGS. 9 to 12.

The LA transmitter 232 may transmit an LA received from the host 300 to the first FTL 210 or the second FTL 220 based on the address information.

Figure 8:
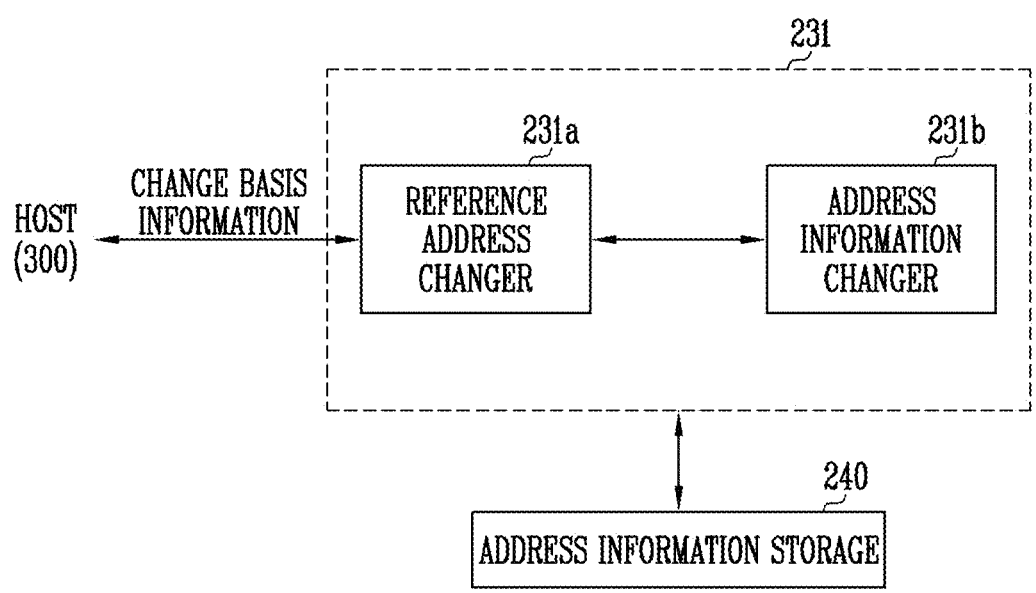
FIG. 8 illustrates an example of an address information manager.

FIG. 8 illustrates an example of the address information manager 231.

Referring FIG. 8, the address information manager 231 may include a reference address changer 231a and an address information changer 231b.

The reference address changer 231a may change the reference address based on a swap timing and a swap offset. At an initial stage, the reference address may be selected from among the LAs included in the host address group information 310. For example, the reference address may be LA 7.

The reference address changer 231a may receive change basis information from the host 300 and set the swap timing and the swap offset based on the change basis information. The change basis information may be information related to an internal operation to be performed in the memory device 100. The change basis information may include information associated with at least one of the following: the size of data received from the host 300; the number of requests received from the host 300; or timer information which is initialized each time the reference address is changed. In some implementations, the swap timing may be set such that the reference address is changed each time a preset size of data is received from the host 300. As the size of data received from the host 300 increases, the swap offset may increase. The change basis information may also include information about the number of requests received from the host 300. For example, the swap timing may be set such that the reference address is changed each time a preset number of requests is received from the host 300. As the number of requests received from the host 300 increases, the swap offset may increase. The change basis information may include timer information which is initialized when the reference address is changed. For example, the swap timing may be set such that the reference address is changed at each preset time.

The reference address changer 231a may change the reference address by the swap offset. The reference address may be changed within the LAs included in the host address group information 310. The swap offset may be n, where n is a natural number. For example, when the swap offset is 8, the value of the LA corresponding to the reference address may increase by 8.

The address information changer 231b may change address information stored in the address information storage 240. In some implementations, the address information changer 231b may change the criterion applied to the LAs included in the swap area, which is determined based on the reference address, and determine whether the LAs included in the swap area will be the first LA group or the second LA group according to the changed criterion. In the case where the LAs included in the swap area are previously included in the first LA group or the second LA group according to the first criterion, the address information may be changed such that the LA group the LAs is assigned to according to the second criterion can be different from the previous assignment of the LA group. In other words, with the changes to the address information by the address information changer 231b, the LA group assignment of the LAs included in the swap area becomes different from the existing group.

In an embodiment of the disclosed technology, since LAs included in the first LA group information 320 and the second LA group information 330 are changed based on the reference address, operations may be evenly distributed among the first memory area 110 and the second memory area 120 even if the same LA is repeatedly received from the host 300. In this way, the uniformity of wear leveling is achieved between the first memory area 110 and the second memory area 120.

Figure 9:
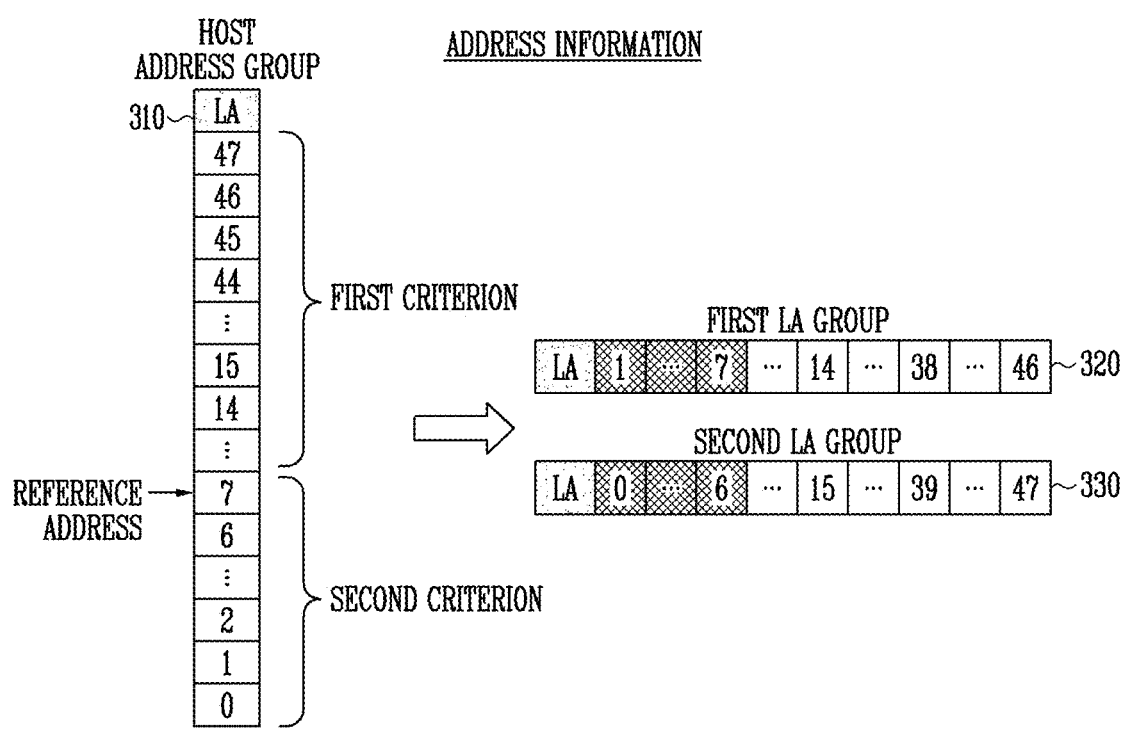
FIG. 9 illustrates an example of an address management method based on an embodiment of the disclosed technology.

FIG. 9 illustrates an example of an address management method based on an embodiment of the disclosed technology.

Referring to FIG. 9, the address information changer 231b may change the first LA group information 320 and the second LA group information 330 based on the reference address.

The reference address may be selected from among the LAs included in the host address group information 310. For example, the reference address may be LA 7. In FIG. 9, the swap area may include LAs each having an address value equal to or lower than the reference address among the LAs included in the host address group.

Unlike the address information illustrated in FIG. 4, the address information changer 231b may include the LAs included in the swap area in the first LA group and the second LA group based on the second criterion. In some implementations, LAs having 1 as the remainder when the LAs are divided by 2 among the LAs included in the swap area may be included in the first LA group. For example, LA 1, LA 3, LA 5, and LA 7 may be included in the first LA group. LAs having 0 as the remainder when the LAs are divided by 2 among the LAs included in the swap area may be included in the second LA group. For example, LA 0, LA 2, LA 4, and LA 6 may be included in the second LA group.

In other words, the LAs included in the swap area may be included in the first LA group information 320 and the second LA group information 330 according to the second criterion rather than the first criterion. In some implementations, odd-numbered LAs among the LAs included in the swap area may be included in the first LA group information 320, and even-numbered LAs may be included in the second LA group information 330.

For example, when an LA received from the host 300 is LA 2, the LA transmitter 232 may transmit LA 2, which is an even LA, to the second FTL 220 according to the second criterion. When an LA received from the host 300 is LA 8, the LA transmitter 232 may transmit LA 8, which is an even LA, to the first FTL 210 according to the first criterion.

The reference address may be changed based on a swap timing and a swap offset. In some implementations, the reference address may be changed by the swap offset at the swap timing. The swap timing and the swap offset may be set based on change basis information. The change basis information may be information related to an internal operation to be performed in the memory device 100. For example, the change basis information may include information about the size of data received from the host 300. In other words, the swap timing may be set such that the reference address is changed each time a preset size of data is received from the host 300. As the size of data received from the host 300 increases, the swap offset may increase. The change basis information may include information about the number of requests received from the host 300. For example, the swap timing may be set such that the reference address is changed each time a preset number of requests is received from the host 300. As the number of requests received from the host 300 increases, the swap offset may increase. The change basis information may include timer information which is initialized when the reference address is changed. For example, the swap timing may be set such that the reference address is changed at each preset time.

The reference address may be changed by the swap offset. The reference address may be changed within the LAs included in the host address group information 310. The swap offset may be n (here, n is a natural number of 1 or more). For example, when the swap offset is 8, the value of the LA corresponding to the reference address may increase by 8. In detail, the reference address may increase from LA 7 to LA 15.

Unlike the example implementation illustrated in FIG. 4 in which the first LA group information 320 includes only even-numbered LAs, the first LA group information 320 illustrated in FIG. 9 may include both the even-numbered LAs and odd-numbered LAs. Unlike the example implementation illustrated in FIG. 4 in which the second LA group information 330 includes only odd-numbered LAs, the second LA group information 330 illustrated in FIG. 9 may include both the even-numbered LAs and odd-numbered LAs.

Therefore, even if LAs received from the host 300 are unevenly distributed between odd-numbered LAs and even-numbered LAs, variations in wear levels (E/W counts) between odd numbered logical addresses and even numbered logical addresses (between the E/W count of the first memory area 110 and the E/W count of the second memory area 120) may be minimized or reduced.

Figure 10:
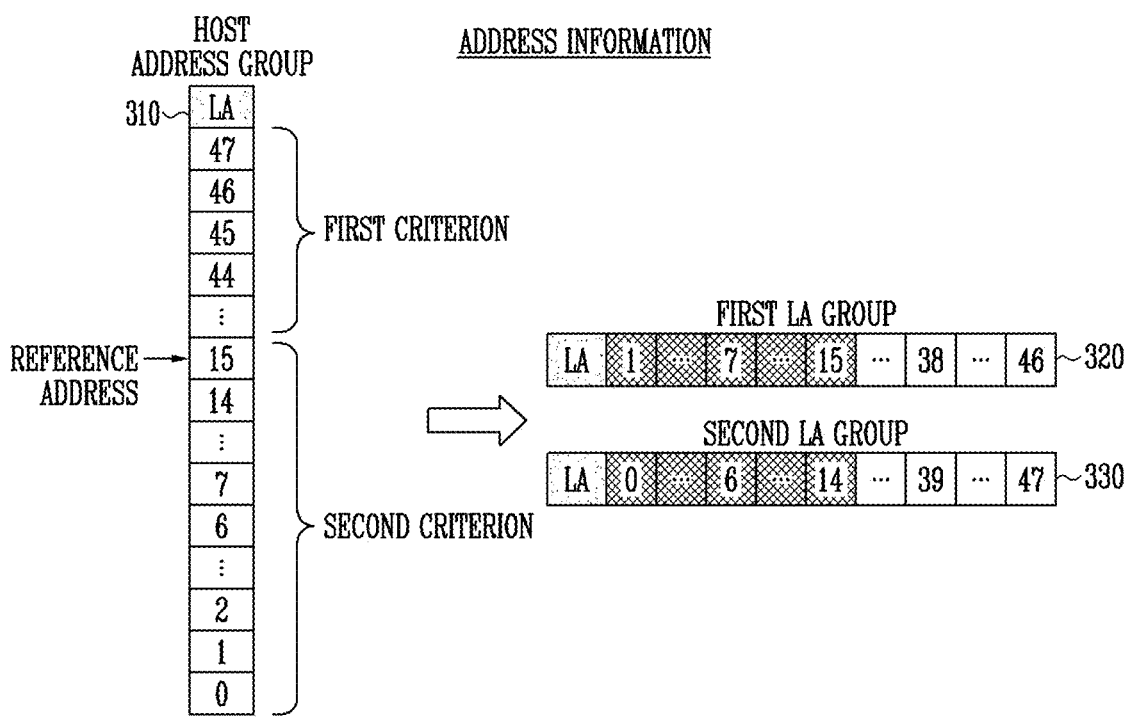
FIG. 10 illustrates an example of an address management method based on an embodiment of the disclosed technology.

FIG. 10 illustrates an example of an address management method based on an embodiment of the disclosed technology.

Referring to FIG. 10, when it is assumed that the swap offset is 8, the reference address changer 231a may change the reference address from LA 7 to LA 15.

The address information changer 231b may change the first LA group information 320 and the second LA group information 330 based on the reference address.

In some implementations, the address information changer 231b may change the criterion to be applied to LA 8 to LA 15, other than LAs the criterion of which has been already changed, among LAs each having an address value equal to or less than LA 15, which is the reference address in this example. In other words, the address information changer 231b may apply the second criterion, instead of the first criterion, to LA 8 to LA 15.

The address information changer 231b may change the first LA group and the second LA group based on the second criterion. Hence, LA 9, LA 11, LA 13, and LA 15 having 1 as the remainder when divided by 2 may be included in the first LA group. Hence, LA 8, LA 10, LA 12, and LA 14 having 0 as the remainder when divided by 2 may be included in the second LA group.

The address information changer 231b may determine a swap area based on the reference addresses before and after the change. In some implementations, the swap area may include LAs that fall between a first reference address (before being changed) and a second reference address (after being changed). For example, in the case where the reference address is changed from LA 7 to LA 15, the swap area may include the logical addresses LA 8 to LA 15.

As the reference address is updated or changed, LAs that otherwise would have been transmitted to the first FTL 210 may be transmitted to the second FTL 220. Therefore, even if LAs received from the host 300 are unevenly distributed between odd-numbered LAs and even-numbered LAs, variations in wear levels (E/W counts) between odd numbered logical addresses and even numbered logical addresses (between the E/W count of the first memory area 110 and the E/W count of the second memory area 120) may be minimized or reduced.

Figure 11:
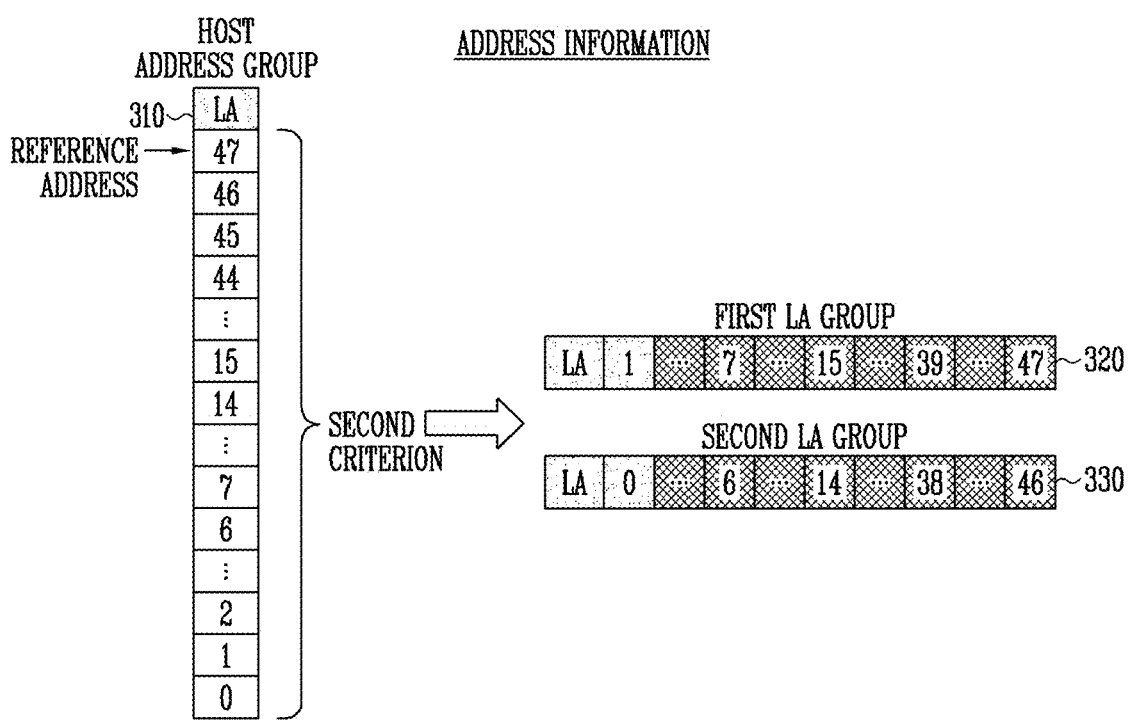
FIG. 11 illustrates an example of an address management method based on an embodiment of the disclosed technology.

FIG. 11 illustrates an example of an address management method based on an embodiment of the disclosed technology.

Referring to FIG. 11, the reference address may be gradually changed to an LA having the largest value among the LAs included in the host address group information 310. As described with reference to FIG. 8, when the swap offset is 8, the reference address may be thereafter changed to LA 47. The reference address may be sequentially changed to LA 7, LA 15, LA 23, LA 31, LA 39, and LA 47 according to the swap timing.

Since the reference address described with reference to FIG. 10 has been LA 15, the criterion to be applied to LA 16 to LA 47 may be changed. In some implementations, LA 16 to LA 47 may be included in the first LA group information 320 and the second LA group information 330 based on the second criterion according to the method described with reference to FIG. 10.

If the number of LAs to which the first criterion is applied is less than the swap offset, the reference address may return to LA 0 and increase again. A detailed method will be described with reference to FIG. 12.

Figure 12:
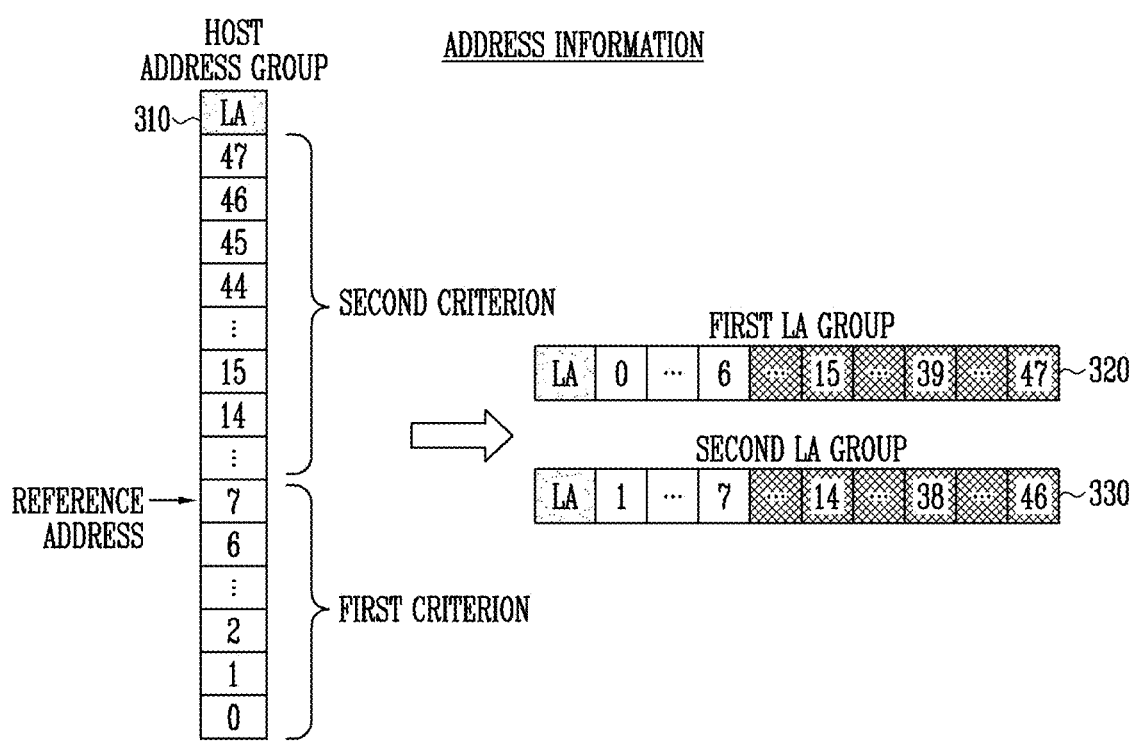
FIG. 12 illustrates an example of an address information management method based on an embodiment of the disclosed technology.

FIG. 12 illustrates an example of an address information management method based on an embodiment of the disclosed technology.

Referring to FIG. 12, the reference address may become LA 7. In some implementations, if a value obtained by adding the swap offset to the reference address is greater than the largest address value among address values of a plurality of LAs included in the host address group, the reference address may increase again from LA 0. For example, a subsequent reference address may be LA 3 if the largest address value is 47, the current reference address is LA 45, and the swap offset is 6.

As illustrated in FIG. 11, in the case where the first LA group information 320 includes only odd-numbered LAs, the E/W count of the first memory area 110 may become greater than the E/W count of the second memory area 120 because LAs received from the host 300 have more odd-numbered LAs than even-numbered LAs. Furthermore, if the E/W count of the first memory area 110 exceeds the threshold count, the second memory area 120 may not be used regardless of its own life cycle.

Some embodiments of the disclosed technology can distribute the plurality of LAs included in the host address group information 310 evenly between the first and second memory areas, regardless of the distribution of odd-numbered LAs and the even-numbered LAs. In this way, the uniformity of wear leveling (E/W count) is achieved between the first memory area 110 and the second memory area 120.

Figure 13:
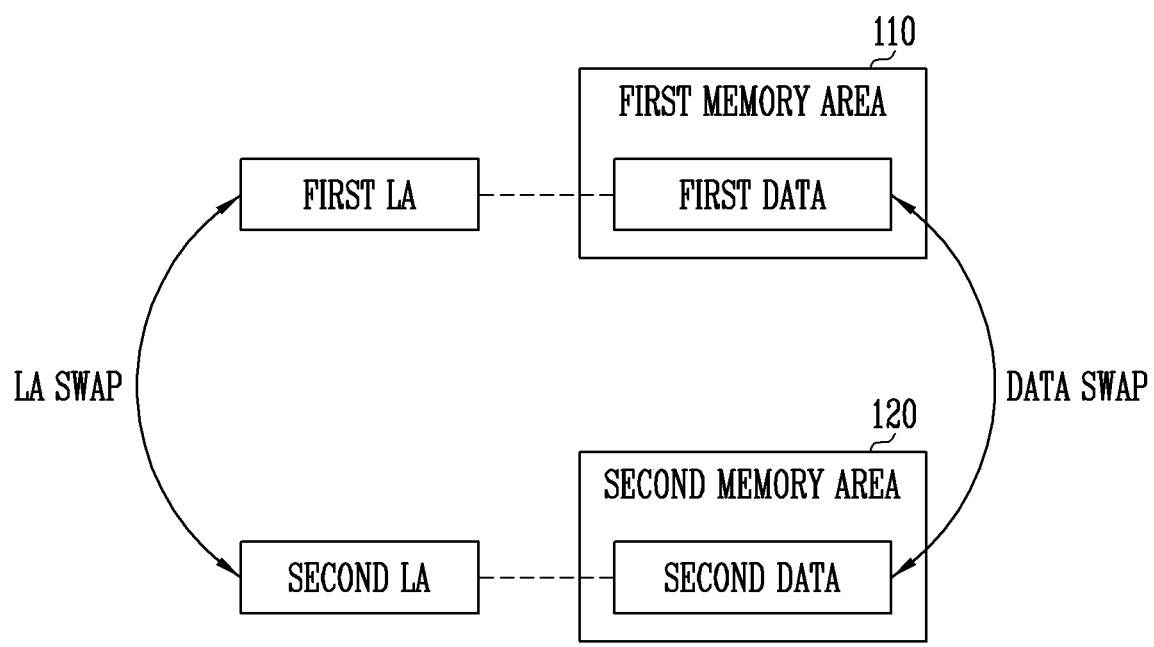
FIG. 13 illustrates an example process of swapping data.

FIG. 13 illustrates an example of a process of swapping data.

Referring to FIG. 13, if the first LA group information 320 and the second LA group information 330 are changed, a data swapper (not illustrated) may swap first data corresponding to a first LA and second data corresponding to a second LA.

In detail, in the case where the host 300 has already made requests for program operations corresponding to the first LA and the second LA, the first data may have been stored in a first memory area 110, and the second data may have been stored in a second memory area 120.

In the case where the first LA is swapped with the second LA, the second FTL 220 may receive the first LA, and the first FTL 210 may receive the second LA. Therefore, when the host 300 requests a read operation corresponding to the first LA to the memory controller 200, the first data is required to move to the second memory area 120 so that the memory controller 200 can transmit the first data to the host 300. Likewise, the second data is required to move to the first memory area 110. Therefore, if the first LA and the second LA are swapped with each other, the first data and the second data may be swapped with each other.

Figure 14:
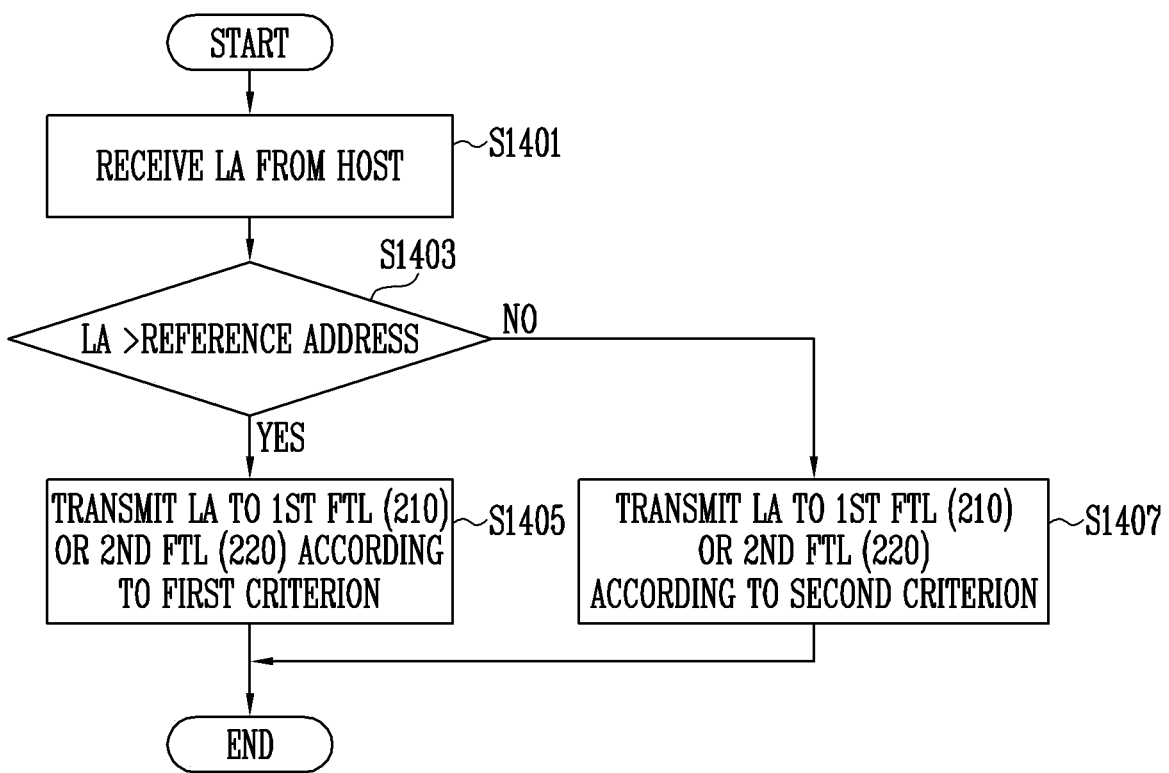
FIG. 14 illustrates an example of a logical address transmission method of a memory controller based on an embodiment of the disclosed technology.

FIG. 14 illustrates an example of a logical address transmission method of a memory controller based on an embodiment of the disclosed technology.

Referring to FIG. 14, at step S1401, the memory controller 200 may receive an LA from the host 300. A group of LAs capable of being received from the host 300 may correspond to the host LA group information 310.

At step S1403, the memory controller 200 may compare the LA received from the host 300 with the reference address. The reference address may be selected from among the LAs included in the host address group information 310. The reference address may be changed based on a swap timing and a swap offset. In some implementations, the reference address may be changed by the swap offset at the swap timing. The swap timing and the swap offset may be set based on change basis information. The change basis information may be information related to an internal operation to be performed in the memory device 100. For example, the change basis information may include information about the size of data received from the host 300. In other words, the swap timing may be set such that the reference address is changed each time a preset size of data is received from the host 300. As the size of data received from the host 300 increases, the swap offset may increase. The change basis information may include information about the number of requests received from the host 300. For example, the swap timing may be set such that the reference address is changed each time a preset number of requests is received from the host 300. As the number of requests received from the host 300 increases, the swap offset may increase. The change basis information may include timer information which is initialized when the reference address is changed. For example, the swap timing may be set such that the reference address is changed at each preset time. If the LA received from the host 300 is greater than the reference address, the process may proceed to step S1407. If the LA received from the host 300 is equal to or less than the reference address, the process may proceed to step S1207.

At step S1405, the LA manager 230 included in the memory controller 200 may transmit the received LA to the first FTL 210 or the second FTL 220 according to the first criterion. The first criterion may be a criterion according to which the LA is transmitted to the first FTL 210 if the LA is an even LA, and the LA is transmitted to the second FTL 220 if the LA is an odd LA.

At step S1407, the LA manager 230 may transmit the received LA to the first FTL 210 or the second FTL 220 according to the second criterion. The second criterion may be a criterion according to which the LA is transmitted to the second FTL 220 if the LA is an even LA, and the LA is transmitted to the first FTL 210 if the LA is an odd LA.

Although for the sake of simplicity of description there has been described the case where the first criterion is used when the LA received from the host 300 is equal to or less than the reference address and the second criterion is used when the LA received from the host 300 is greater than the reference address, the second criterion may be used when the LA received from the host 300 is equal to or less than the reference address, and the first reference may be used when the LA received from the host 300 is greater than the reference address. In other words, as illustrated in FIG. 12, when the reference address reaches an LA having the largest address value after having continuously increased by the swap offset, the reference address may increase again from LA 0. As illustrated in FIG. 12, in the case where the reference address increases again from LA 0, because the second criterion has been applied to the plurality of LAs included in the host address group, the second criterion may be used when the LA received from the host 300 is equal to or less than the reference address, and the first criterion may be used when the LA received from the host 300 is greater than the reference address.

Figure 15:
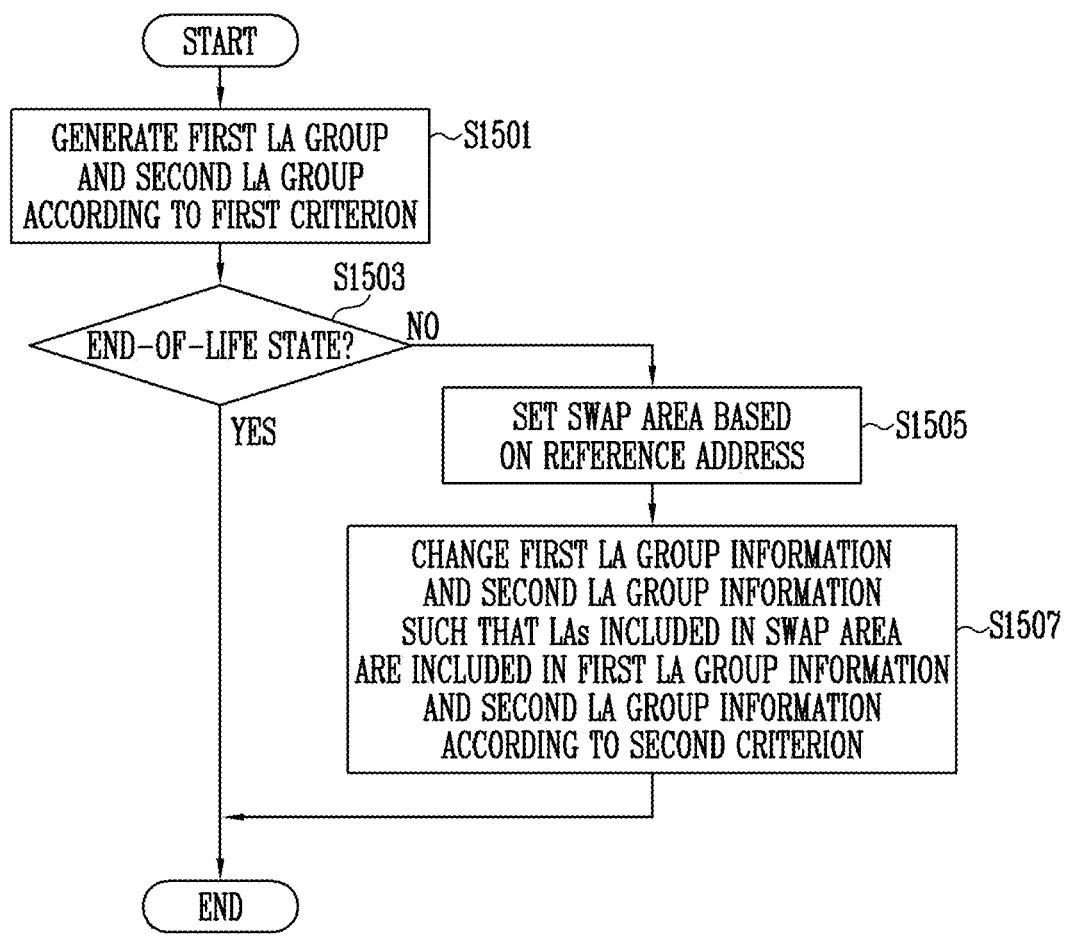
FIG. 15 is a flowchart showing an example of an address information management method of the memory controller based on an embodiment of the disclosed technology.

FIG. 15 showing an example of an address information management method of the memory controller based on an embodiment of the disclosed technology.

Referring to FIG. 15, at step S1501, the memory controller 200 may generate first LA group information 320 and second LA group information 330 based on the first criterion. The first LA group information 320 may be a group of LAs to be transmitted to the first FTL 210. The second LA group information 330 may be a group of LAs to be transmitted to the second FTL 220. The first criterion may be a criterion according to which even LAs are included in the first LA group information 320, and odd LAs are included in the second LA group information 330.

At step S1503, the memory controller 200 may check whether the memory device 100 has reached its end of life (e.g., whether the memory device 100 has reached a predetermined maximum erase/write cycle count (end-of-life state). The end-of-life state may refer to a state in which data cannot be written to the memory device 100. The end-of-life state may also refer to a state in which data cannot be read from the memory device 100. If the memory device 100 is in the end-of-life state, the address information management may be finished. If the memory device 100 is not in the end-of-life state, the process may proceed to step S1505.

At step S1505, the memory controller 200 may set a swap area based on the reference address. The reference address may be selected from among a plurality of LAs capable of being received from the host 300. The reference address may be changed based on a swap timing and a swap offset. The swap timing and the swap offset may be set based on change basis information. The memory controller 200 may perform an operation of setting the swap area according to the method described with reference to FIGS. 9 to 12.

At step S1507, the memory controller 200 may change the first LA group information 320 and the second LA group information 330 such that LAs included in the swap area are included in the first LA group information 320 and the second LA group information 330 according to the second criterion. For example, the first LA group information 320 and the second LA group information 330 may be changed such that even LAs included in the swap area are included in the second LA group information 330 and odd LAs included in the swap area are included in the first LA group information 320.

In an embodiment, since LAs included in the first and second LA group information 320 and 330 are consistently changed, the access of the host 300 to the memory areas may be evenly distributed among different memory areas. Consequently, variations in wear levels (E/W counts) between odd numbered logical addresses and even numbered logical addresses (between the E/W count of the first memory area 110 and the E/W count of the second memory area 120) may be minimized or reduced.

Figure 16:
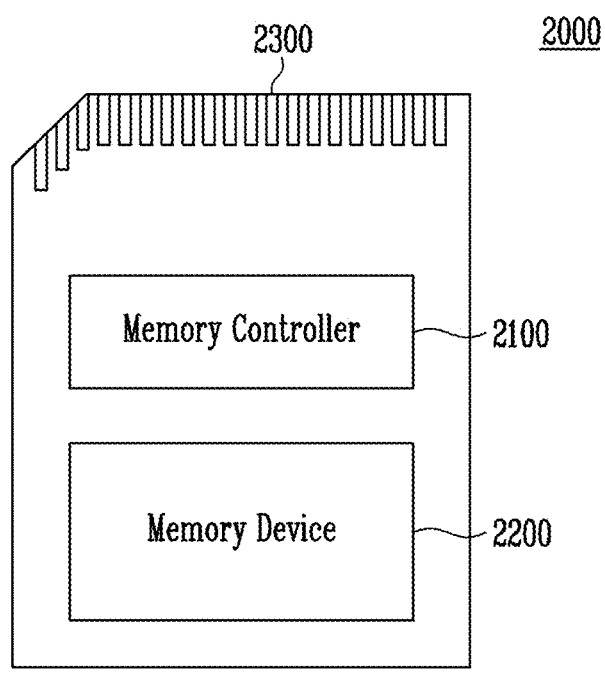
FIG. 16 is a block diagram illustrating an example of a memory card system that includes a data storage device implemented based on an embodiment of the disclosed technology.

FIG. 16 is a block diagram illustrating an example of a memory card system 2000 that include a data storage device implemented based on an embodiment of the disclosed technology.

Referring FIG. 16, the memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2200 and the host. The memory controller 2100 may perform firmware operations for controlling the memory device 2200.

In an embodiment, the memory controller 2100 may include components such as a random access memory (RAM), a processing unit, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In an embodiment, the memory controller 2100 and the memory device 2200 may be integrated into a single semiconductor device to form a memory card. For example, the memory controller 2100 and the memory device 2200 may be integrated into a single semiconductor device to form a memory card such as a personal computer memory card international association (PCMCIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

Figure 17:
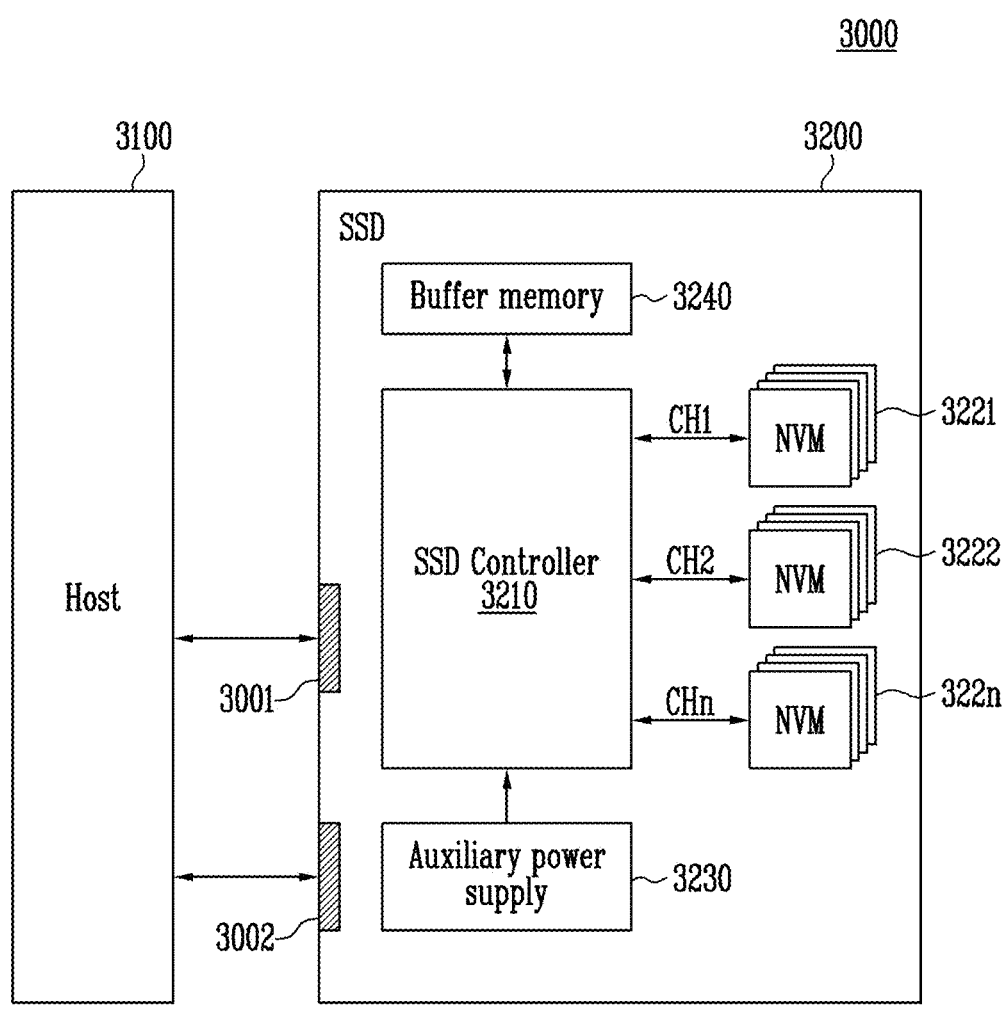
FIG. 17 is a block diagram illustrating an example of a solid state drive (SSD) system that includes a data storage device implemented based on an embodiment of the disclosed technology.

FIG. 17 is a block diagram illustrating an example of a solid state drive (SSD) system 3000 that includes a data storage device implemented based on an embodiment of the disclosed technology.

Referring to FIG. 17, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322$n$, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322$n$ in response to the signals SIG received from the host 3100. In an embodiment, the signals SIG may be signals based on an interface between the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322$n$ or may temporarily store metadata (e.g., a mapping table) of the flash memories 3221 to 322$n$. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 18:
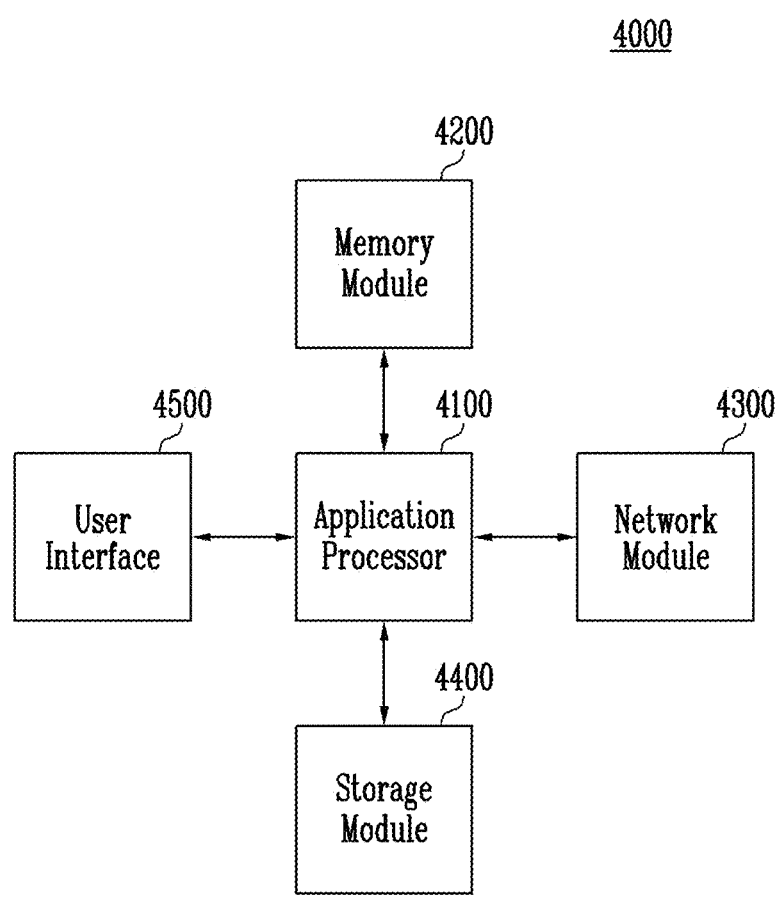
FIG. 18 is a block diagram illustrating an example of a user system that includes a data storage device implemented based on an embodiment of the disclosed technology.

FIG. 18 is a block diagram illustrating an example of a user system 4000 that includes a data storage device implemented based on an embodiment of the disclosed technology.

Referring to FIG. 18, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDRAM, and an LPDDR3 SDRAM, or a nonvolatile RAM such as a PRAM, a ReRAM, an MRAM, and an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of the plurality of nonvolatile memory devices may be operated in the same manner as that of the memory device 100 described above with reference to FIGS. 10 to 13. The storage module 4400 may be operated in the same manner as that of the data storage device 50 described above with reference to FIG. 1.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as an a Liquid Crystal Display (LCD), an Organic Light Emitting Diode (OLED) display device, an Active Matrix OLED (AMOLED) display device, an LED, a speaker, a monitor, and so on.

A memory device and a method of operating the memory device based on an embodiment of the disclosed technology may provide improved wear-leveling performance.

Examples of embodiments have been disclosed. Variations, modifications or improvements to the disclosed embodiments and other embodiments may be made based on what is disclosed and illustrated.

What is claimed is:

1. A memory controller configured to control a first memory area and a second memory area, the memory controller comprising:
   a first software layer configured to control the first memory area based on first logical addresses;
   a second software layer configured to control the second memory area based on second logical addresses; and
   a logical address manager configured to:
      compare a logical address received from a host with a reference address selected from among a plurality of logical addresses to be used by the host;
      select a criterion out of a first criterion and a second criterion based on the comparison; and
      transmit the logical address received from the host to the first software layer or the second software layer according to the selected criterion,
   wherein allocation of the logical addresses to the first software layer or the second software layer according to the first criterion is different from allocation of the logical addresses to the first software layer or the second software layer according to the second criterion, and
   wherein the selected criterion is changed from the first criterion to the second criterion or from the second criterion to the first criterion when the comparison is changed.

2. The memory controller according to claim 1, wherein the first software layer controls the first memory area to perform an operation corresponding to a logical address transmitted from the logical address manager, and
   wherein the second software layer controls the second memory area to perform an operation corresponding to a logical address transmitted from the logical address manager.

3. The memory controller according to claim 1, wherein the logical address manager transmits the logical address to the first software layer or the second software layer according to the second criterion when an address value of the logical address is equal to or less than an address value of the reference address.

4. The memory controller according to claim 1, wherein the logical address manager transmits the logical address to the first software layer or the second software layer according to the first criterion when an address value of the logical address is greater than an address value of the reference address.

5. The memory controller according to claim 1,
   wherein, according to the second criterion, the logical address manager transmits the logical address to the first software layer when the logical address is an odd logical address, and transmits the logical address to the second software layer when the logical address is an even logical address, and
   wherein, according to the first criterion, the logical address manager transmits the logical address to the first software layer when the logical address is an even logical address, and transmits the logical address to the second software layer when the logical address is an odd logical address.

6. The memory controller according to claim 1, wherein the logical address manager comprises a reference address changer configured to change the reference address based on change basis information.

7. The memory controller according to claim 6, wherein the change basis information includes information about a size of data received from the host, or timer information that is initialized when the reference address is changed.

8. The memory controller according to claim 1,
wherein first data stored in the first memory area and second data stored in the second memory area are swapped with each other, and
wherein a logical address corresponding to the first data has an address value equal to or less than an address value of the reference address, and a logical address corresponding to the second data has an address value equal to or less than the address value of the reference address.

9. A memory controller configured to control a first memory area and a second memory area, the memory controller comprising:
a first flash translation layer configured to control the first memory area based on a logical address included in a first logical address group;
a second flash translation layer configured to control the second memory area based on a logical address included in a second logical address group;
a logical address manager configured to determine logical addresses to be included in the first logical address group and the second logical address group, based on a result of comparison between a reference address and the plurality of logical addresses; and
an address information changer configured to change logical addresses included in the first logical address group and logical addresses included in the second logical address group based on the reference address,
wherein the reference address is selected from a host address group including a group of logical addresses to be used by a host, and
wherein the address information changer sets a swap area based on the reference address, and changes, according to a first criterion or a second criterion selected based on the result of comparison, a logical address group including logical addresses that fall within the swap area among the plurality of logical addresses.

10. The memory controller according to claim 9, wherein the logical address manager comprises:
a reference address changer configured to change the reference address based on change basis information.

11. The memory controller according to claim 10, wherein the address information changer includes, in the first logical address group and the second logical address group according to the first criterion, logical addresses each having an address value equal to or less than an address value of the reference address among a plurality of logical addresses included in the host address group.

12. The memory controller according to claim 10, wherein the address information changer includes, in the first logical address group and the second logical address group according to the second criterion, logical addresses each having an address value greater than an address value of the reference address among a plurality of logical addresses included in the host address group.

13. The memory controller according to claim 10,
wherein, based on the first criterion, an even logical address is included in the first logical address group, and an odd logical address is included in the second logical address group, and
wherein, based on the second criterion, an even logical address is included in the second logical address group, and an odd logical address is included in the first logical address group.

14. The memory controller according to claim 10, wherein the change basis information comprises information about a size of data received from the host, or timer information that is initialized each time the reference address is changed.

15. The memory controller according to claim 9,
wherein first data stored in the first memory area and second data stored in the second memory area are swapped with each other, and
wherein a logical address corresponding to the first data has an address value equal to or less than an address value of the reference address, and a logical address corresponding to the second data has an address value equal to or less than the address value of the reference address.

16. A method of operating a memory controller including a first flash translation layer configured to control a first memory area, and a second flash translation layer configured to control a second memory area, the method comprising:
comparing a logical address received from a host with a reference address selected from among a plurality of logical addresses to be used by the host;
selecting one of a first criterion and a second criterion based on a comparison between the logical address received from the host and the reference address; and
transmitting the logical address to one of the first flash translation layer and the second flash translation layer according to the selected criterion,
wherein the logical address is transmitted to different flash translation layers in each of the first criterion and the second criterion, and
wherein the selected criterion is changed from the first criterion to the second criterion or from the second criterion to the first criterion when the comparison is changed.

17. The method according to claim 16,
wherein, according to the first criterion, the received logical address is transmitted to the first flash translation layer when the received logical address is an even logical address, and the received logical address is transmitted to the second flash translation layer when the received logical address is an odd logical address, and
wherein, according to the second criterion, the received logical address is transmitted to the second flash translation layer when the received logical address is an even logical address, and the received logical address is transmitted to the first flash translation layer when the received logical address is an odd logical address.

18. The method according to claim 17, wherein transmitting the logical address comprises transmitting the received logical address to the first flash translation layer or the second flash translation layer according to the second criterion in response to information that the received logical address is equal to or less than the reference address.

19. The method according to claim 17, wherein transmitting the logical address comprises transmitting the received logical address to the first flash translation layer or the second flash translation layer according to the first criterion in response to information that the received logical address is greater than the reference address.

20. The method according to claim 16, wherein the reference address is updated based on change basis information, and wherein the change basis information comprises information about a size of data received from the host, or timer information that is initialized when the reference address is changed.

21. The method according to claim 16, further comprising swapping first data stored in the first memory area and second data stored in the second memory area with each other, wherein a logical address corresponding to the first data has an address value equal to or less than an address value of the reference address, and a logical address corresponding to the second data has an address value equal to or less than the address value of the reference address.

* * * * *